(12) United States Patent
Vasil'Evich et al.

(10) Patent No.: US 8,290,082 B2
(45) Date of Patent: Oct. 16, 2012

(54) METHOD FOR SIGNAL TRANSMISSION-RECEPTION IN A MULTI-USER MULTIPLE TRANSMIT AND MULTIPLE RECEIVE ANTENNA RADIO COMMUNICATION SYSTEM

(75) Inventors: Garmonov Alexander Vasil'Evich, Voronezh (RU); Kravtsova Galina Semenovna, Voronezh (RU); Bespalov Oleg Viktorovich, Voronezh (RU); Sung-Soo Hwang, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 416 days.

(21) Appl. No.: 12/691,493

(22) Filed: Jan. 21, 2010

(65) Prior Publication Data

US 2010/0183089 A1    Jul. 22, 2010

(30) Foreign Application Priority Data

Jan. 21, 2009    (RU) ................................ 2009101776

(51) Int. Cl.
*H04B 7/02*    (2006.01)
(52) U.S. Cl. ...................................................... 375/267
(58) Field of Classification Search .................... 375/267
See application file for complete search history.

(56) References Cited

U.S. PATENT DOCUMENTS

2006/0251061 A1* 11/2006 Kim et al. ...................... 370/366
2009/0028264 A1*  1/2009 Zhang et al. ................... 375/267
2009/0286494 A1* 11/2009 Lee et al. .................... 455/114.3

OTHER PUBLICATIONS

A. K. Lenstra et al., Factoring polynomials with rational coefficients, Mathematische Annalen, 1982, pp. 515-534, vol. 261.
802.16TM IEEE Standard for local and metropolitan area networks, Part 16: Air Interface for Fixed Broadband Wireless Access Systems, Oct. 1, 2004.
J.C. Mundarath et al., Zero-Forcing Beamforming for Non-Collaborative Space Division Multiple Access, Proceedings of 2006 IEEE International Conference on Acoustics, Speech and Signal Processing ICASSP, May 14-19, 2006, p. 4, vol. 4.
A Wiesel et al., Optimal Generalized Inverses for Zero Forcing Precoding, 41st Annual Conference on Information Sciences and Systems, CISS '07, Mar. 14-16, 2007, pp. 130-134.
John G. Proakis, Digital Communication, McGraw-Hill, 1995, pp. 686-693, Third Edition.
G.J. Foshini et al., Simplified processing for high spectral efficiency wireless communication employing multi-element arrays, IEEE Selected Areas Communication, Nov. 1999, pp. 1841-1852, vol. 17.

(Continued)

*Primary Examiner* — Leon-Viet Nguyen
(74) *Attorney, Agent, or Firm* — Jefferson IP Law, LLP

(57) ABSTRACT

An apparatus and method for signal transmission-reception in a multi-user multiple transmit and multiple receive antenna radio communication system are provided. An aspect of the present invention is to enhance reception performance and increase the communication channel throughput. This is achieved by applying a new sequence of operations including a vector perturbation procedure along with an efficient perturbation vector searching technique based on single-dimensional optimization of a decision function. In addition, the method ensures simple implementation of a subscriber station receiver. The SS receiver is implemented as independent channels for processing signals of different receive antennas. The receiver can be implemented even if each subscriber station has only one receive antenna. Accordingly, the method proves highly efficient in virtually any propagation environment.

42 Claims, 8 Drawing Sheets

OTHER PUBLICATIONS

R.F.H. Fischer et al., Space-Time Transmission using Tomlinson-Harashima Precoding, in Proc. 4th Int. ITG Conf., Jan. 2002, pp. 139-147, Berlin.

Q. H. Spencer et al., Capacity and Downlink Transmission Algorithms for a Multi-user MIMO Channel, Signals, Systems and Computers, 2002. Conference Record of the Thirty-Sixth Asilomar Conference, Nov. 3-6, 2002, pp. 1384-1388, vol. 2.

Dirk Wubben et al., Near-Maximum-Likelihood Detection of MIMO Systems using MMSE-Based Lattice Reduction, IEEE Proc. International Conference on Communications (ICC), Jun. 2004, Paris, France.

M. Airy et al., Practical Costa precoding for the multiple antenna broadcast channel, IEEE Global Telecommunications Conference, GLOBECOM, Nov. 29-Dec. 3, 2004, pp. 3942-3946, vol. 6.

Christoph Windpassinger et al., Lattice-Reduction-Aided Broadcast Precoding, IEEE Transactions on Communications, Dec. 2004, pp. 2057-2060, vol. 52, No. 12.

Z. Jane Wang et al., A MIMO-OFDM Channel Estimation Approach Using Time of Arrivals, IEEE Transactions on Wireless Communications, May 2005, pp. 1207-1213, vol. 4, No. 3.

John G. Proakis, Digital Communication, McGraw-Hill, Third Edition.

* cited by examiner

METHOD FOR SIGNAL TRANSMISSION-RECEPTION IN A MULTI-USER MULTIPLE TRANSMIT AND MULTIPLE RECEIVE ANTENNA RADIO COMMUNICATION SYSTEM

PRIORITY

This application claims the benefit under 35 U.S.C. §119(a) of a Russian patent application filed on Jan. 21, 2009 in the Russian Intellectual Property Office and assigned Serial No. 2009101776, the entire disclosure of which is hereby incorporated by reference.

BACKGROUND OF THE INVENTION

1. Field of Invention

The present invention relates to radio engineering. More particularly, the present invention relates to a method for signal transmission-reception in a multi-user multiple transmit and multiple receive antenna radio communication system.

2. Description of Related Art

The technology using multiple transmit and multiple receive antennas is attractive as an efficient method for improving communication channel throughput without requiring additional radio spectrum expense. In radio communication systems that apply the technology, a communication channel between transmit and receive sides has multiple inputs, transmit antennas, and multiple outputs, receive antennas. Hereupon the technology is called Multiple-Input-Multiple-Output (MIMO).

The entire set of signal propagation channels between transmit and receive antennas is called a MIMO channel. One method to increase throughput is the simultaneous transmission of different information flows over different spatial subchannels of the MIMO channel. This method is known as spatial multiplexing, examples of which are illustrated by G. J. Foshini, G. D. Golden, and R. A. Valenzuela, in "Simplified processing for high spectral efficiency wireless communication employing multi-element arrays," IEEE Selected Areas Communication, vol. 17, pp. 1841-1852, November, 1999, and in the Institute of Electrical and Electronics Engineers (IEEE) 802.16™ Standard for local and metropolitan area networks, Part 16: Air Interface for Fixed Broadband Wireless Access Systems, 1 Oct. 2004.

According to the spatial multiplexing technique, independent information flows are transmitted via different transmit antennas. At the receive side the transmission coefficients $h_{j,i}$ of all spatial channels are estimated, where i, j are indices of the transmit and receive antennas forming the respective spatial channel. The channel matrix H is formed from the said coefficients and used at signal reception.

Until recently, transmit-receive methods for single-user MIMO channels with one receiver and one transmitter (point-to-point) have been widely developed.

An obstacle for MIMO technology application in the point-to-point system is the necessity to mount multiple antennas on the Subscriber Station (SS). This difficulty arises because the SS must generally meet small-size and low cost requirements.

Another problem of the single user MIMO technology is that the throughput increase depends on scattering properties of the signal propagation environment. In this case, to obtain a noticeable throughput gain, the signal propagation environment is required to have scattering objects and antenna systems to have antennas spaced a long distance from each other.

One method to address the problem is by means of the multi-user MIMO technology. According to this technology, a channel formed by multiple antennas of a Base Station (BS) on the one side and antennas of multiple SSs on the other is considered as a MIMO channel. Each SS may have a small number of antennas or even only one antenna as well.

Multi-user approaches make it possible to exploit additional advantages of the MIMO technology.

First, there is a possibility to increase throughput by spatial division when several subscriber stations use one and the same physical channel to communicate with the BS.

Second, a multi-user MIMO channel has relatively low correlation between spatial subchannels because they belong to different subscriber terminals. This provides throughput gain even in a low scattering environment.

Third, there is a possibility to implement MIMO algorithms when a subscriber station has one antenna or a small number of antennas.

At present, there is known an efficient solution for the multi-user MIMO algorithm in the uplink (from SSs to the BS). The solution includes a method of collaborative spatial multiplexing used to transmit signals from multiple SSs to a BS. This solution is taken into account by modern communication standards such as the IEEE 802.16™ Standard for local and metropolitan area networks, Part 16: Air Interface for Fixed Broadband Wireless Access Systems, 1 Oct. 2004.

However, the problem of increasing capacity is more important for the downlink (from the BS to SSs) over which greater volume and high-rate data flows are transmitted. At the same time, there is no simple and efficient multi-user algorithm for a MIMO downlink Implementation of multi-user MIMO approaches in the downlink faces two major problems. The first problem is the need to provide the transmitter with communication channel information. The second problem is that joint processing of signals of different subscriber terminals is virtually impossible in the multi-user channel in contrast to the single-user MIMO channel.

Therefore, development of a multi-user MIMO algorithm of signal transmission-reception in the communication system downlink is a relevant and important task.

Downlink multi-user technology generally consists in signal transformation before its on-air transmission, whereby transformation is usually called pre-transmission or precoding. There are several multi-user MIMO approaches known in the downlink. The different approaches include dirty paper coding as illustrated by M. Airy, A. Forenza, R. W. Heath, Jr., and S. Shakkottai, in "Practical Costa precoding for the multiple antenna broadcast channel," IEEE Global Telecommunications Conference, GLOBECOM, 29 Nov.-3 Dec. 2004, Volume 6, Page(s): 3942-3946, block diagonalization as illustrated by Q. H. Spencer, and M. Haardt, in "Capacity and Downlink Transmission Algorithms for a Multi-user MIMO Channel," Signals, Systems and Computers, 2002. Conference Record of the Thirty-Sixth Asilomar Conference, Volume 2, Issue, 3-6 Nov. 2002 Page(s): 1384-1388, and various methods of linear multi-user precoding such as illustrated by J. C. Mundarath, and J. H. Kotecha, in "Zero-Forcing Beamforming for Non-Collaborative Space Division Multiple Access," Proceedings of 2006 IEEE International Conference on Acoustics, Speech and Signal Processing ICASSP, 14-19 May 2006, Volume: 4, page(s): IV-IV, and A Wiesel, Y. C. Eldar, and Sh. Shamai, in "Optimal Generalized Inverses for Zero Forcing Precoding," 41st Annual Conference on Information Sciences and Systems, CISS '07, 14-16 Mar. 2007, pages: 130-134.

However, most of the methods are of high implementation complexity and require complex study before their practical use.

For example, a block diagonalization algorithm that is a theoretically efficient implementation method for multi-user MIMO technology is illustrated by Q. H. Spencer, and M. Haardt, in "Capacity and Downlink Transmission Algorithms for a Multi-user MIMO Channel," Signals, Systems and Computers, 2002. Conference Record of the Thirty-Sixth Asilomar Conference, Volume 2, Issue 3-6, Nov. 2002, Page(s): 1384-1388. According to this algorithm, multi-user signal precoding is performed in such a way that the MIMO channel is transformed into orthogonal spatial sub-channels corresponding to different subscriber terminals. These channels do not generate mutual interference. Signal transmission-reception of each subscriber terminal is executed in the respective spatial sub-channel using one of the known signal-user MIMO algorithms.

To implement the above approach it is necessary to estimate transmission coefficients of all spatial communication channels and to form a channel matrix. Channel matrix information includes auxiliary control information and shall be transmitted to the BS in any manner. The BS shall then make a singular value decomposition of the channel matrix. The BS uses the resulting information about right singular vectors during signal transmission. Information about left singular vectors shall be transmitted from the BS to SSs so that they will be able to receive a signal.

Implementation of this algorithm is complex as it requires two-way, high rate transmission of high volume control data. Another disadvantage of the algorithm is that it is applicable only in the case when subscriber terminals have two or more receive antennas.

Other and more simple linear multi-user precoding methods are known including Minimum Mean Squared Error (MMSE) and Zero Forcing (ZF) methods as illustrated by [J. C. Mundarath, and J. H. Kotecha, in "Zero-Forcing Beamforming for Non-Collaborative Space Division Multiple Access," Proceedings of 2006 IEEE International Conference on Acoustics, Speech and Signal Processing ICASSP, 14-19 May 2006, Volume: 4, page(s): IV-IV, and by A. Wiesel, Y. C. Eldar, and Sh. Shamai, in "Optimal Generalized Inverses for Zero Forcing Precoding," 41st Annual Conference on Information Sciences and Systems, CISS '07, 14-16 Mar. 2007, pages: 130-134.

According to these algorithms, signal precoding is executed by a linear transformation whose matrix is formed by inversion or pseudo-inversion of the channel matrix H. As a result of precoding, only the desired signal is generated in each receive antenna of each of SS with no interference created by signals intended for other receive antennas. The ZF and MMSE methods are applicable for terminals equipped by one antenna and multiple antennas as well.

One of the simplest multi-user precoding methods is a method of channel inversion or ZF.

According to the channel inversion method, the packet $a_1, \ldots, a_S$ is formed from modulation symbols to be simultaneously transmitted to U SSs, where S is the summed number of the SS receive antennas and the number of symbols transmitted to each SS equals the number of receive antennas of the given SS.

A packet is represented as the vector $a = [a_1 \ldots a_S]^T$, whose elements (or coordinates) are packet symbols.

The transmitted signal vector s is formed from the given vector by multiplying the vector a by the channel matrix inversion or pseudo-inversion if the matrix H is not square. For simplicity, consider the case of S=N when the matrix H is square. Then, $$s = H^{-1}a \tag{1}$$

A multitude of signals received by an SS can be represented as elements of the vector which in turn could be expressed as $$y = Hx + n, \tag{2}$$

where n is a vector of receive antenna noise components which are well approximated as independent Gaussian random values, and x is a normalized transmitted signal vector obtained by transforming the vector s:

$$x = \frac{s}{\sqrt{E[\gamma]}}, \tag{3}$$

$\gamma = \|s\|^2$ is signal power and, $E[\gamma]$ is mathematical expectation of $\gamma$.

By substituting (1) and (3) into (2), one can get $$y = \frac{1}{\sqrt{E[\gamma]}} I_s a + n, \tag{4}$$

where n denotes a noise component vector of the SS receive antennas, and $I_S$ is a unitary diagonal matrix of S×S size.

It can be seen from (4) that the received signals of users are mutually independent and do not create mutual interference. However, normalization (3) leads to the signal transmission coefficient being equal to $$\frac{1}{\sqrt{E[\gamma]}}.$$

The value of $\gamma = \|s\|^2 = \|H^{-1}a\|^2$ in the denominator of the expression depends on inversion of the channel matrix H and could be quite high especially in a poor conditioned channel. Presence of this coefficient is the main reason of reducing the relative useful power at the receive point and respective lowering of the reception interference stability.

Therefore, an increase of the signal power because of multi-user precoding is the major disadvantage of the ZF and MMSE methods. Since there is a transmission power limitation in a communication system, the signal amplitude is linearly decreased (according to (3)). However, it leads to great reduction of the desired signal power relative to noise at the receive point. As a result, the reception interference stability becomes low.

There is another method for transmission power limitation that avoids significant reduction of relative desired power at the receive point. The method is based on the non-linear modulo reducing operation (or modulo operation) used in signal pre-processing algorithms, such as illustrated by R. F. H. Fischer, C. Windpassinger, A. Lampe, and J. B. Huber, in "Space-Time Transmission using Tomlinson-Harashima Precoding," In Proc. 4th Int. ITG Conf., pp. 139-147, Berlin, January 2002.

The modulo operation consists of adding to the real and imaginary parts of an input number the values which are multiple of the real value A called a modulo. An input value of the mentioned operation is a complex number representing a transformed signal. The added values are selected in such a way that the summed complex number is in the central domain of the complex plane where all complex symbols of the used constellation are located. Hence, the transmitted signal power is reduced. The modulo value is known at both the transmit and receive sides and thus allows recovery of the signal reduced during reception.

The most efficient way of using the non-linear modulo operation is a vector perturbation algorithm as illustrated by Christoph Windpassinger, Robert F. H. Fischer, and Johannes B. Huber, in "Lattice-Reduction-Aided Broadcast Precoding," IEEE TRANSACTIONS ON COMMUNICATIONS, VOL. 52, NO. 12, DECEMBER 2004, pp. 2057-2060.

Vector perturbation includes adding a certain perturbing vector p to the information symbol vector a. The resulting signal after multi-user precoding can be represented as $$x = H^{-1}(a+p) \tag{5}$$

Real and imaginary parts of elements of the vector p are determined to be multiple of modulo A selected so that $$-\frac{A}{2} < \text{Re}a, \text{Im}a < \frac{A}{2}, \tag{6}$$

where Rea, Ima are real and imaginary parts of any complex symbol of the applied modulation constellation.

The signal y received in the channel of each receive antenna of each subscriber station is subject to non-linear modulo operation $$\tilde{y} = \tilde{z} + j \cdot \tilde{c} \tag{7}$$

where $$\tilde{z} = z \bmod A, \tilde{c} = c \bmod A, z = \text{Re}(y), c = \text{Im}(y), \tag{8}$$

$$x \bmod A = x - A \cdot \left\lfloor \frac{x + A/2}{A} \right\rfloor \tag{9}$$

$\lfloor x \rfloor$ is a maximum integer not exceeding x.

The main feature of the modulo operation is it is invariant to adding of-fold values:

$$(y+rA) \bmod A = y \bmod A, \tag{10}$$

where r is any integer.

Owing to this feature, after modulo operation, signals of the receive antennas of all SS can be represented by the vector $$\tilde{y}[H \cdot H^{-1} \cdot (a+p)+n] \bmod A = I_S a + n \tag{11}$$

where $I_S$ is a unitary diagonal matrix of S×S size.

This equality proves that vectors of the transmitted and received signals are linearly connected by means of the diagonal matrix $I_S$. That is, multi-user precoding results in forming the desired signal in each receive antenna with no interference generated by the signals transmitted for other receive antennas.

The maximum multi-user precoding efficiency is achieved when the power of the transmitted signal $x = H^{-1} \cdot (a+p)$ is reduced as much as possible by selecting the perturbing vector p. That is, the optimal perturbing vector $p_{opt}$ shall be determined in the transmitter such that its addition to the information symbol vector a provides the signal power minimum after multi-user precoding:

$$p_{opt} = \arg \min_{p \in A \square_Z^S} \|H^{-1}(a+p)\|^2, \tag{12}$$

where $\square_z^s$ is a set of S-dimensional vectors whose elements have integer-valued real and imaginary parts.

Resolving of optimization task (12) is complicated in that the set of integers is not constrained, hence the set $\square_z^s$ is infinite. Therefore, exhaustive search of all values of the set $\square_z^s$ is impossible. Although the set of the considered integers can be limited by some values close to zero, e.g., {−2, −1, 0, 1, 2}, even in this case the search set could be extensive. For example, if the search set is composed of $(5^2)^S=625$ vectors at S=2 and $(5^2)^S=390625$ vectors at S=4. Therefore, the exhaustive search method to resolve (12) leads to a substantial increase of implementation complexity.

One approach to resolving the optimization task (12) consists in the use of lattice basis reduction as illustrated by Christoph Windpassinger, Robert F. H. Fischer, and Johannes B. Huber, in "Lattice-Reduction-Aided Broadcast Precoding," IEEE TRANSACTIONS ON COMMUNICATIONS, VOL. 52, NO. 12, DECEMBER 2004, pp. 2057-2060. This method consists of the following.

The method for signal transmission-reception in a radio communication system, containing a transmit station equipped with N transmit antennas and U receive stations, where U≧2, each receive station is equipped with at least one receive antenna, and the summed number of receive antennas of the receive stations S fulfills the condition 1<S≦N, consists of the following:

transmission coefficients of a set of spatial communication channels are estimated, each channel being formed by one transmit antenna of a transmit station and one receive antenna of a receive station, signals are transmitted-received between the transmit and receive stations for which:

at the transmit station, U sets of modulation symbols are formed from U information messages to be transmitted to U receive stations, packets of S modulation symbols each are formed from the formed sets of the modulation symbols by including in a packet one modulation symbol per each of the receive antennas of the receive stations, a modulation symbol packet is presented in the form of a vector of transmitted modulation symbols $a=[a_1 \ldots a_S]^T$, the channel matrix H is formed from the transmission coefficients of spatial communication channels, a real-valued vector $a_r$ and a matrix $H_r$ are formed from the vector of transmitted modulation symbols a and the channel matrix H by the equations:

$$a_r = \begin{bmatrix} \text{Re}a \\ \text{Im}a \end{bmatrix} H_r = \begin{bmatrix} \text{Re}H & -\text{Im}H \\ \text{Im}H & \text{Re}H \end{bmatrix}, \tag{13}$$

where ReY and ImY are matrices composed of real and imaginary parts of the respective elements of the matrix Y, the linear multi-user signal pre-transformation matrix $W_r$ is formed from the real-valued channel matrix $H_r$, $$W_r = (H_r^H H_r)^{-1} H_r^H, \tag{14}$$

by reducing the lattice basis of the matrix $W_r$ the integer-valued matrix T with a determinant equal to ±1 is formed in such a way that multiplication by this matrix transforms the multi-user linear pre-transformation matrix to the matrix $Z = W_r T$ with a low condition number, using the matrix T a perturbing vector is determined by the formula:

$$p_0 = -T \cdot A \cdot Q(T^{-1} \cdot a_r/A), \tag{15}$$

where Q(x) is a vector derived from the vector x by rounding its elements to the nearest integers, A is a real number so that real Re$a$ and imaginary Im$a$ parts of any modulation symbol are strictly less than A/2 by the absolute value:

$$-\frac{A}{2} < \text{Re}a, \text{Im}a < \frac{A}{2} \qquad (16)$$

a perturbed real-valued vector of transmitted modulation symbols is formed by summing the real-valued vector of transmitted modulation symbols and a perturbing vector and linear multi-user pre-transformation of the obtained perturbed real-valued vector of modulation symbols is performed, thus forming a real-valued vector of transmitted signals:

$$x_r = W_r(a_r + p_0), \qquad (17)$$

a transmitted signal vector is formed from the obtained real-valued vector of transmitted signals $x_r$:

$$x = x_r(1:N) + j \cdot x_r(N+1:2N), \qquad (18)$$

where j means an imaginary unit and $x_r(n:m)$ denotes a vector composed of a sequence of elements of the vector $x_r$ from the n-th to the m-th element, a set of signals determined by elements of the transmitted signal vector x is transmitted over all transmit antennas, by one signal over an antenna, signals are received at each of U receive stations, while reception is performed in a channel of each receive antenna and during reception, a signal y is formed as a complex number with a modulo and an argument representing the signal amplitude and phase received by a channel of the given antenna, respectively, real and imaginary parts of the signal are determined as:

$$z = \text{Re}y, c = \text{Im}y \qquad (19)$$

a modulo operation is executed over the obtained signals z and c with the modulo equal to A:

$$\tilde{z} = z - A \left\lfloor \frac{z + A/2}{A} \right\rfloor \qquad (20)$$
$$\tilde{c} = c - A \left\lfloor \frac{c + A/2}{A} \right\rfloor,$$

where $\lfloor x \rfloor$ is an integer part of x, (i.e., the maximum integer not exceeding x), a complex signal $\tilde{y} = \tilde{z} + j\tilde{c}$ is formed from the signals $\tilde{z}$ and $\tilde{c}$ and using values of the complex signal $\tilde{y}$ thus formed in a channel of each receive antenna, the received signal is demodulated and decoded.

The method for signal transmission-reception in a multi-user MIMO communication system applies linear signal pre-transformation based on channel matrix inversion (or pseudo-inversion).

It is an efficient method for multi-user precoding for at least two reasons. First, mutual signal interference is suppressed in receive antennas as a result of this transformation. Second, the receive side does not require any additional auxiliary information for signal demodulation, thus making possible relatively simple implementation of the receive unit.

However, due to signal multiplication by channel matrix inversion (or pseudo-inversion) signal power is greatly increased. Vector perturbation is used to reduce power.

In this case an optimal perturbing vector is determined as a vector minimizing the value of $\|W_r \cdot (p + a_r)\|^2$.

The task of searching for an optimal perturbing vector could be represented as a task of searching for the vector $W_r \cdot p$, which is maximally close to the vector $-W_r \cdot a_r$. In the matrix theory, a set of vectors $W_r \cdot p$ is known as a lattice space of the matrix $W_r$. A search within the lattice space is greatly simplified if a matrix has a low condition number, which is the ratio of the maximum singular value to the minimum one. In this case, the matrix has a greater degree of column orthogonality and the solution of $W_r \cdot p = -W_r \cdot a_r$ can be approximated as follows:

$$p = -A \cdot Q\left(\frac{a_r}{A}\right), \qquad (21)$$

where Q(x) is rounding up of the vector x elements to the closest integers.

The approximation accuracy depends on the orthogonality degree of the matrix $W_r$ columns or proximity of its condition number to one.

To reduce the condition number of matrix $W_r$, the lattice basis reduction method is used. In this case, the linear pre-transformation matrix $W_r$ is transformed to the matrix Z with a low condition number and higher degree of column orthogonality. Lattice basis reduction consists in forming the integer-valued matrix T with a determinant of ±1 so that the equality $Z = W_r T$ is fulfilled between the source and transformed matrices.

After transformation, the optimum perturbing vector is found as follows:

$$p_0 = -T \cdot A \cdot Q\left(\frac{T^{-1} \cdot a_r}{A}\right) \qquad (22)$$

However, in spite of the fact that the lattice basis reduction reduces in average the matrix condition number and increases its column orthogonality degree, it does not ensure ideal column orthogonality of the linear pre-transformation matrix. As a consequence, the selected perturbing vector does not always provide the minimum of $\|W_r \cdot (p + a_r)\|^2$. This produces an increase in the average transmitted signal power and an increase in the range of transmitted signal power values.

The first aspect leads to a decrease in the channel throughput due to a decrease of the desired signal power at the receive point caused by power normalization during transmission. The second aspect results in an increase in the peak-to-average power ratio. This in its turn increases requirements of the amplifier linearity and complicates implementation of the method in communication hardware.

SUMMARY OF THE INVENTION

An aspect of the present invention is to address at least the above-mentioned problems and/or disadvantages and to provide at least the advantages described below. Accordingly, an aspect of the present invention is to enhance the reception performance and increase the communication channel throughput by applying a new sequence of operations including a vector perturbation procedure along with an efficient perturbing vector search technique based on single-dimensional optimization of the decision function.

According to an aspect of the present invention, a method for signal communication in a multi-user radio communication system, including a transmit station, having N transmit antennas, and U≧2 receive stations, each receive station having at least one receive antenna and the summed number S of receive antennas of receive stations satisfies 1<S≦N, wherein signals are transmitted-received by means of F≧1 physical channels is provided. The method includes estimating transfer coefficients of all possible spatial communication channels respectively formed by one transmit antenna of the transmit station and one receive antenna of a receive station for each of F physical channels, transmitting signals by the transmit station and receiving signals by the receive stations using F physical channels, where, for this purpose:

at the transmit station, U respective sets of modulation symbols are generated from U information messages to be transmitted to U receive stations, the resulting modulation symbol sets are used to generate F packets each having S modulation symbols, where Sk modulation symbols are included into each packet for each k-th receive station, and Sk is the number of receive antennas of the k-th receive station, each of F modulation symbol packets are transmitted over the corresponding physical channel in such a way that each modulation symbol is represented by a complex number a, and a modulation symbol packet is represented as a vector of transmitted modulation symbol $a=[a_1 \ldots a_S]^T$, the estimates of spatial channel transfer coefficients are used to form channel matrix H of the physical channel used, the vector a of transmitted modulation symbols and channel matrix H are used to form real-valued vector $a_r$ and matrix $H_r$ according to $$a_r = \begin{bmatrix} \mathrm{Re}\, a \\ \mathrm{Im}\, a \end{bmatrix}, H_r = \begin{bmatrix} \mathrm{Re}\, H & -\mathrm{Im}\, H \\ \mathrm{Im}\, H & \mathrm{Re}\, H \end{bmatrix},$$

where ReX, ImX are matrices made up of real and imaginary parts of the respective elements of matrix X, the real-valued channel matrix $H_r$ is used to form linear multi-user transformation matrix $W_r$, the real-valued vector $a_r$ and linear multi-user transformation matrix $W_r$ are employed to determine an optimal perturbing vector in such a way to minimize the transmitted signal power, and the optimal perturbing vector is determined by searching over a set of vectors, elements of which are multiples of a real number A, selected in such a way that absolute value of real and imaginary part of any modulation symbol would not exceed A/2, the search is performed including the following steps:

vector $a_r$ and matrix $W_r$ are used to form an auxiliary vector $q_0$, which determines the search initial point so that vector $A \cdot q_0$ belongs to the set of perturbing vectors p, for each coordinate of auxiliary vector $q_0$ an optimal variation step value is sequentially calculated that provides a maximum degree of transmitted signal power reduction, a suboptimal step value is also calculated, which provides the lower degree of transmitted signal power reduction, at that the step values are chosen from a limited set of integers, the first optimized vector $q_1$ is formed by adding the optimal value of the respective coordinate variation step to each coordinate of auxiliary vector $q_0$, the second optimized vector $q_2$ is formed by adding the suboptimal value of the respective coordinate variation step to each coordinate of auxiliary vector, the first $q_1$ and the second $q_2$ optimized vectors are used to form a set of candidate vectors including the vectors each coordinate of which is a respective coordinate of the first $q_1$ or the second $q_2$ optimized vector, and each of these vectors is included into the candidate vector set considering the transmitted signal power corresponding to this vector, the real-valued vector $a_r$ and linear multi-user transformation matrix $W_r$ are used to determine an optimal auxiliary vector $q_{opt}$ as a vector of the candidate vector set providing minimum transmitted signal power, the optimal auxiliary vector $q_{opt}$, the value A and matrix $W_r$ are used to form an optimal perturbing vector $p_{opt}$, thus completing the search for the optimal perturbing vector, a perturbed real-valued vector of transmitted modulation symbols is generated by adding the real-valued transmitted modulation symbols vector to the optimal perturbing vector after that the resulting vector is subjected to linear multi-user transformation thereby providing the real-valued transmitted signal vector as:

$$x_r = W_r(a_r + p_{opt}),$$

the resulting vector $x_r$ is used to obtain the non-normalized transmitted signal vector $$x_0 = x_r(1:N) + j \cdot x_r(N+1:2N),$$

where j is an imaginary unit, and denotes a vector made up of vector $x_r$ elements from the n-th to the m-th, a vector of transmitted signals x is formed by multiplying the non-normalized transmitted signals vector $x_0$ by the normalizing coefficient $C_T$, $$x = x_0 \cdot C_T,$$

the signals corresponding to the elements of the obtained vector x are transmitted over the appropriate physical channel via all transmit antennas—one signal over an antenna, the signals are received at each of U receive stations so that in each physical channel of each receive antenna the reception is carried out in such a way that a signal y is formed as a complex number with a modulo and an argument corresponding to the amplitude and phase of the signal received by this physical channel, the signal y is normalized by multiplying it by the normalizing coefficient $C_R$, thus forming a normalized signal:

$$y_{norm} = y \cdot C_R,$$

real and imaginary parts of the normalized signal $y_{norm}$ are obtained as $$z = \mathrm{Re}\, y_{norm}, \quad c = \mathrm{Im}\, y_{norm}.$$

The resulting signals z and c are subjected to modulo operation with modulus A:

$$\tilde{z} = z - A \left\lfloor \frac{z + A/2}{A} \right\rfloor$$

$$\tilde{c} = c - A \left\lfloor \frac{c + A/2}{A} \right\rfloor$$

where $\lfloor x \rfloor$ is an integer part of x, i.e. the maximum integer less than x, these signals $\tilde{z}$ and $\tilde{c}$ are used to form a complex signal $$\tilde{y} = \tilde{z} + j\tilde{c},$$

the complex signals $\tilde{y}$ thus formed in each physical channel of each receive antenna are used to demodulate and decode the received signal.

In an exemplary embodiment, modulation symbols of the transmit station are generated so that each of U information messages to be transmitted to U receive stations are correspondingly represented as a sequence of binary symbols and then binary symbols of the said sequence are coded, interleaved and modulated.

A linear multi-user transformation matrix $W_r$ may be formed, for example, as $$W_r = (H_r^H H_r)^{-1} H_r^H$$

where $H_r$ is a real-valued channel matrix of the respective physical channel 1.

The auxiliary vector $q_0$, which determines the search initial point is formed in such a way that by performing the matrix $W_r$ lattice basis reduction, an integer-valued matrix T with a determinant equal to ±1 is formed in such a way that multiplication by T transforms the linear multi-user transformation matrix into matrix $Z = W_r T$, which has a certainly low condition value, the matrix T and the real-valued vector of transmitted modulation symbols $a_r$ are used to calculate an auxiliary vector as $$q_0 = -Q(T^{-1} \cdot a_r / A)$$

where $Q(x)$ is a vector obtained from vector x by rounding its elements to the closest integers.

In forming the first $q_1$ and the second $q_2$ optimized vectors the degree of transmission power reduction due to changing the j-th vector coordinate is determined based on the degree of decision function reduction $$F_j(\lambda) = \|W_r \cdot (a_r + A \cdot T \cdot (q_1 + \lambda \cdot e_j))\|^2,$$

where $e_j$ is a 2S-dimensional vector, the j-th coordinate of which equals 1 and the rest coordinates are zero.

In forming the first $x_1$ and the second $x_2$ optimized vectors, the step value is selected from the multitude $\square = \{-1, 0, 1,\}$.

When the optimal auxiliary vector is determined, the transmitted signal power is estimated by $\|W_r \cdot (a_r + A \cdot T \cdot q)\|^2$.

The optimal perturbing vector $p_{opt}$ is formed using the optimal auxiliary vector $q_{opt}$, the value A and matrix $W_r$ by the formula:

$$p_{opt} = A \cdot T \cdot q_{opt},$$

where T is an integer-valued matrix with the determinant equal to ±1, multiplication by which transforms the matrix $W_r$ into the matrix $Z = W_r T$, which has a certainly low condition value.

To form the transmitted signal vector the normalizing coefficient $C_T$ is selected in such as way that the average transmit power of the formed vector x is equal to the power of signals transmitted by the transmit stations without multi-user transformation.

The normalizing coefficient $C_R$ is set so as to equal the inverse value of the normalizing transfer coefficient:

$$C_R = \frac{1}{C_T}.$$

Performance enhancement and throughput increase in the present invention are achieved by a new sequence of operations including a vector perturbation procedure along with an efficient technique of perturbing vector search based on the single-dimensional optimization of decision function.

The search procedure is executed in such a way that:

vector $a_r$ and matrix $W_r$ are used to form an auxiliary vector $q_0$, which determines the initial search point so that vector $A \cdot q_0$ belongs to the set of perturbing vectors p, for each coordinate of auxiliary vector $q_0$ an optimal variation step value is sequentially determined, which provides a maximum degree of transmitted signal power reduction, a suboptimal step value is also calculated, which leads to a lower degree of transmitted signal power reduction, at that the step value is chosen from a limited set of integers, the first optimized vector $q_1$ is formed by adding the optimal value of the respective coordinate variation step to each coordinate of auxiliary vector, the second optimized vector $q_2$ is formed by adding the suboptimal value of the respective coordinate variation step to each coordinate of auxiliary vector $q_0$, the first $q_1$ and the second $q_2$ optimized vectors are used to form a set of candidate vectors including the vectors each coordinate of which is a respective coordinate of the first $q_1$ or the second $q_2$ optimized vector, and each of these vectors is included into the candidate vector set considering the transmitted signal power corresponding to this vector, the real-valued vector $a_r$ and linear multi-user transformation matrix $W_r$ are used to determine an optimal auxiliary vector $q_{opt}$ as a vector of the candidate vector set providing minimum transmitted signal power, the optimal auxiliary vector $q_{opt}$, the value A and the matrix $W_r$ are used to form an optimal perturbing vector $p_{opt}$, thus completing the search for the optimal perturbing vector.

In addition, an advantage of an exemplary method according to the present invention is simple implementation of the subscriber station (SS) receiver. The SS receiver is implemented as independent channels for processing signals of different receive antennas.

An important strength of this invention is that it can be implemented even if each SS has only one receive antenna.

Another benefit according to an exemplary embodiment of the present invention is that it is highly efficient in almost any propagation environment. Note that to increase throughput based on traditional single-user MIMO methods, the propagation environment should provide minimum correlation between spatial channels corresponding to different antennas. This is not always implemented in practice especially if antennas of some communication side are too close or the propagation environment has low scattering.

At the same time, an exemplary method according to the present invention offers a throughput gain even in a relatively low-scattering environment because the receiver side antennas belong to different subscriber terminals. As a result, their signals have low correlation regardless of the propagation environment properties.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In what follows, an exemplary method for signal transmission-reception in a multi-user multiple transmit and multiple receive antenna radio communication system is provided. However, it is not intended that the invention be limited to the disclosed exemplary embodiment.

In accordance with an exemplary embodiment of the present invention, a method for signal transmission-reception in a multi-user, multiple transmit and multiple receive antenna radio communication system is provided in a system comprising a Base Station (BS) and at least two Subscriber Stations (SS).

Figure 1:
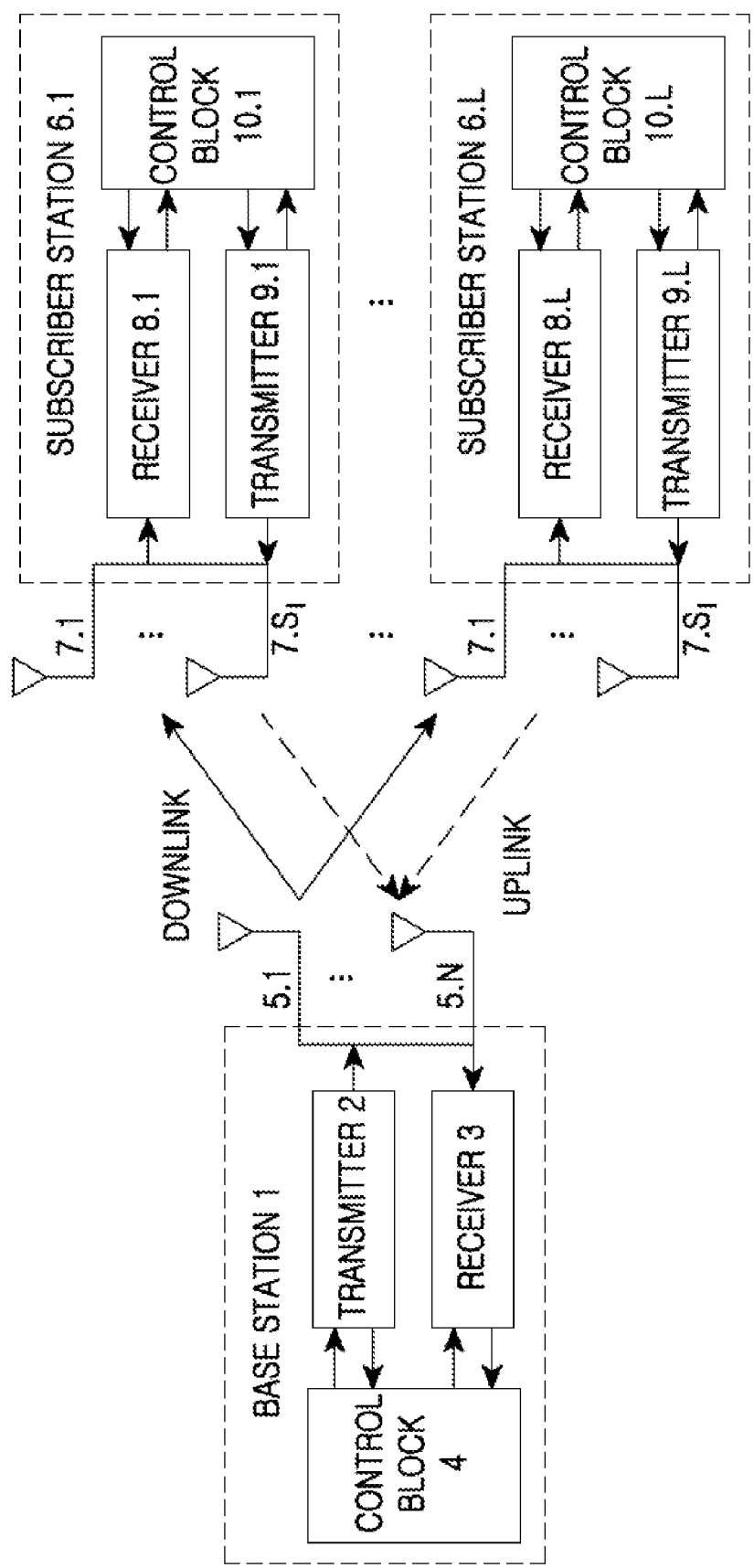
FIG. 1 is a block diagram of a multi-user, multiple transmit and multiple receive antenna radio communication system according to an exemplary embodiment of the present invention.

FIG. 1 is a block diagram of a multi-user, multiple transmit and multiple receive antenna radio communication system according to an exemplary embodiment of the present invention.

Referring to FIG. 1, an exemplary structure of this radio communication system includes one BS 1 and L subscriber stations 6.1-6.L. Furthermore, BS 1 is equipped with N antennas 5.1-5.N, a first transmitter 2 and a receiver 3 for transmitting and receiving signals on the N antennas, and a control block 4 for controlling transmitter 2 and transmitter 3.

Each i-th SS (i=1, . . . L), out of L SSs 6.1-6.L, is equipped with receive-transmit antennas $7.1\text{-}7.S_i$, outputs and inputs of which are connected with the inputs and outputs of the respective receivers 8.1-8.L and transmitters 9.1-9.L. Also, each i-th SS includes a control block 10.1-10.L for controlling the respective receiver and transmitter of the SS. The number of antennas $S_i$ of different SSs (i=1, . . . L) can vary. For example, the system may comprise SSs with one antenna and SSs with several antennas (i.e., $N \geq S_i \geq 1$). In another exemplary implementation, all subscriber stations may have one antenna each.

In an exemplary embodiment, the method is implemented in the downlink of the communication system shown in FIG. 1 to enhance its throughput.

High data rate systems usually use a rather wide frequency bandwidth. In these conditions the Multiple Input Multiple Output (MIMO) channel is subjected to frequency selective distortions which, in the time domain, appear as a multipath. An effective way to combat multipath is by use of Orthogonal Frequency Division Multiplexing (OFDM), which is equivalent to representing one frequency selective channel as a set of frequency subchannels with no frequency selectivity. This is reflected in the up-to-date communication system standards under development such as the Institute of Electrical and Electronic Engineers (IEEE) 802.16 and 802.20 standards that include all basic mechanisms of the MIMO-OFDM technology application.

The following description of an exemplary method illustrates implementation of the invention using a MIMO-OFDM communication system as an example. Of course, it is to be understood that this is merely for ease of description and not to be construed as limiting the invention to a specific communication system.

In the multi-user radio communication systems, the signal transmission-reception between transmit and receive stations is carried out by means of multiple physical communication channels. In the OFDM systems, orthogonal frequency subchannels corresponding to different subcarriers are used as such physical channels.

Exemplary embodiments of the present invention ensure higher throughput by providing the service simultaneously to several subscriber stations using the same physical channels.

To avoid interference between the signals at reception points, SS signals are jointly processed at the BS before the transmission. In doing this, the channel state information is used.

In an exemplary implementation, the total number of SS antennas should not be more than the number of BS antennas. If, for example, the BS has 4 antennas, N=4, a group of four SSs with one antenna each or a group of two SSs each having two antennas, or a group of one SS with one receive antenna and one SS with three receive antennas can be simultaneously served.

This requirement limits the number of subscribers that can be served at the same time. However, a communication system can have many more users. Thus, in control block 4 of BS 1, SSs 6.1-6.L are arranged by combining them into groups.

Of all the SSs, groups of SSs meant to receive joint service are formed. In addition, some SSs in the system are serviced individually (i.e., in a conventional way adopted by the communication standard in use).

In each group for joint service, all SSs are served at the same time in frequency subchannels that are common for SSs of this group. In a group of individual service SSs, each SS receives individual service by means of frequency subchannels dedicated to this SS only. Different parameters such as the number of antennas, BS loading, long-term channel state information, an indicator of each SS channel quality, and other parameters are used to group the SSs.

In an exemplary embodiment, joint service SSs can be used in a group.

In the following description, it is assumed that each of M groups of joint service SSs is composed of U SSs. Each SS is equipped with G receive antennas. In doing so, G meets the stipulated above condition when the summed number of antennas is $S=U \cdot G \leqq N$. Further, in the following description, it is also assumed that each SS group applies F frequency sub-channels for communication.

Figure 2:
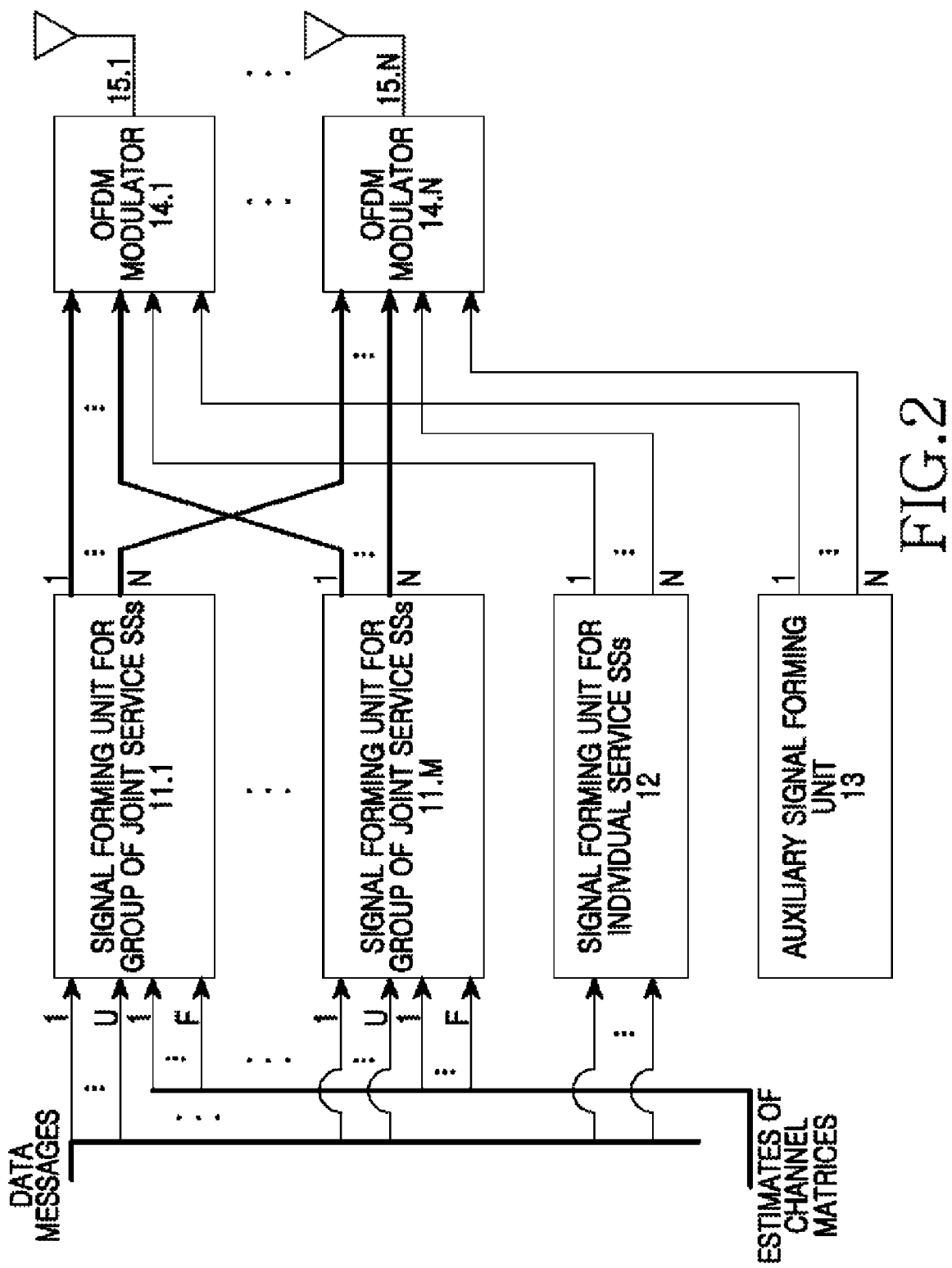
FIG. 2 is a block diagram of a Base Station (BS) transmitter of a MIMO-OFDM communication system according to an exemplary embodiment of the present invention.

FIG. 2 is a block-diagram of BS transmitter of a MIMO-OFDM system according to an exemplary embodiment of the present invention.

Referring to FIG. 2, the transmitter includes signal forming units for groups of joint service SSs 11.1-11.M, where M is the number of groups of jointly served SSs, a signal forming unit for individual service SSs 12, an auxiliary signal forming unit 13, OFDM modulators 14.1-14.N and antennas 15.1-15.N respectively connected to OFDM modulators 14.1-14.N.

The first U inputs of each of the M signal forming units for groups of joint service SSs 11.1-11.M and inputs of the signal forming unit for individual service SSs 12 constitute the first inputs of transmitter 2 and are inputs of information messages. The second F inputs of each of the M signal forming units for groups of joint service SSs 11.1-11.M constitute the second inputs of transmitter 2 and are inputs of channel matrix estimates. N outputs of each of the M signal forming units for groups of joint service SSs 11.1-11.M are correspondingly connected with the first inputs of N OFDM modulators 14.1-14.N, whose second inputs are connected with N outputs of the signal forming unit for individual service SSs 12, and the third inputs of N OFDM modulators 14.1-14.N are connected with N outputs of the auxiliary signal forming unit 13. Outputs of the N OFDM modulators 14.1-14.N are respectively connected with inputs of N transmit antennas 15.1-15.N, whose outputs are outputs of transmitter 2.

Information messages to be transmitted to SSs of the respective groups are applied to the first U inputs of each of signal forming units for groups of joint service SSs 11.1-11.M. Channel matrix estimates of subcarriers used for SS service of the respective group are applied to the second F inputs of each of signal forming units for groups of joint service SSs 11.1-11.M.

Signals of F subcarriers to be transmitted over the respective transmit antenna are formed at each of N outputs of each of the M signal forming units for groups of joint service SSs 11.1-11.M.

Information about the subcarriers used is applied in the form of control signals from the BS control block via control inputs to the signal forming units for groups of joint service SSs 11.1-11.M.

For the sake of convenience, the block-diagrams illustrated in FIGS. 2 through 5, do not depict control signals though they are implied to be provided from the BS control block to the control inputs of units involved in the schemes of devices accomplishing the claimed method.

The signals to be transmitted to the groups of joint service SSs and generated at the outputs of the signal forming units for groups of joint service SSs 11.1-11.M are applied to the inputs of OFDM modulators 14.1-14.N.

The signals for individual service SSs are formed in the forming unit 12. In this case, control block 4 of BS 2 determines subcarriers for communication with each SS. When forming signals, information about the subcarriers, modulation types, coding techniques and transmission-reception techniques stipulated by the communication standard and used in the system for individual service SSs is taken into account (see, for example, IEEE 802.16™ Standard for local and metropolitan area networks, Part 16: Air Interface for Fixed Broadband Wireless Access Systems, 1 Oct. 2004).

The signals to be transmitted to individual service SSs formed at the outputs of the signal forming unit for individual service SSs 12 are applied to the second inputs of the OFDM modulators 14.1-14.N.

Auxiliary signal forming unit 13 produces auxiliary signals required for communication in the MIMO-OFDM system such as pilot, null carrier, guard bands and DC carrier signals (see, for example IEEE 802.16™ Standard for local and metropolitan area networks, Part 16: Air Interface for Fixed Broadband Wireless Access Systems, 1 Oct. 2004).

Signals generated in forming units 12 and 13 are correspondingly fed to the second and third inputs of OFDM modulators 14.1-14.N. Therefore, signals of all frequency subcarriers to be transmitted via a transmit antenna connected with the output of the given OFDM modulator are applied to inputs of each OFDM modulator 14.1-14.N. OFDM modulators 14.1-14.N execute conventional operations of OFDM signal generation (e.g., inverse discrete Fourier transform, cyclic prefix adding, etc. (see, for example, John G. Proakis, "Digital Communication," McGraw-Hill, Third Edition)], transform to analog form, shift to RF domain and undergo RF signal processing. The generated radio signals are then transmitted via the transmit antennas 15.1-15.N.

For a better understanding of the exemplary embodiment, an operation of a signal forming unit for a group of joint service SSs (e.g., 11.1-11.M) is considered in more detail.

Figure 3:
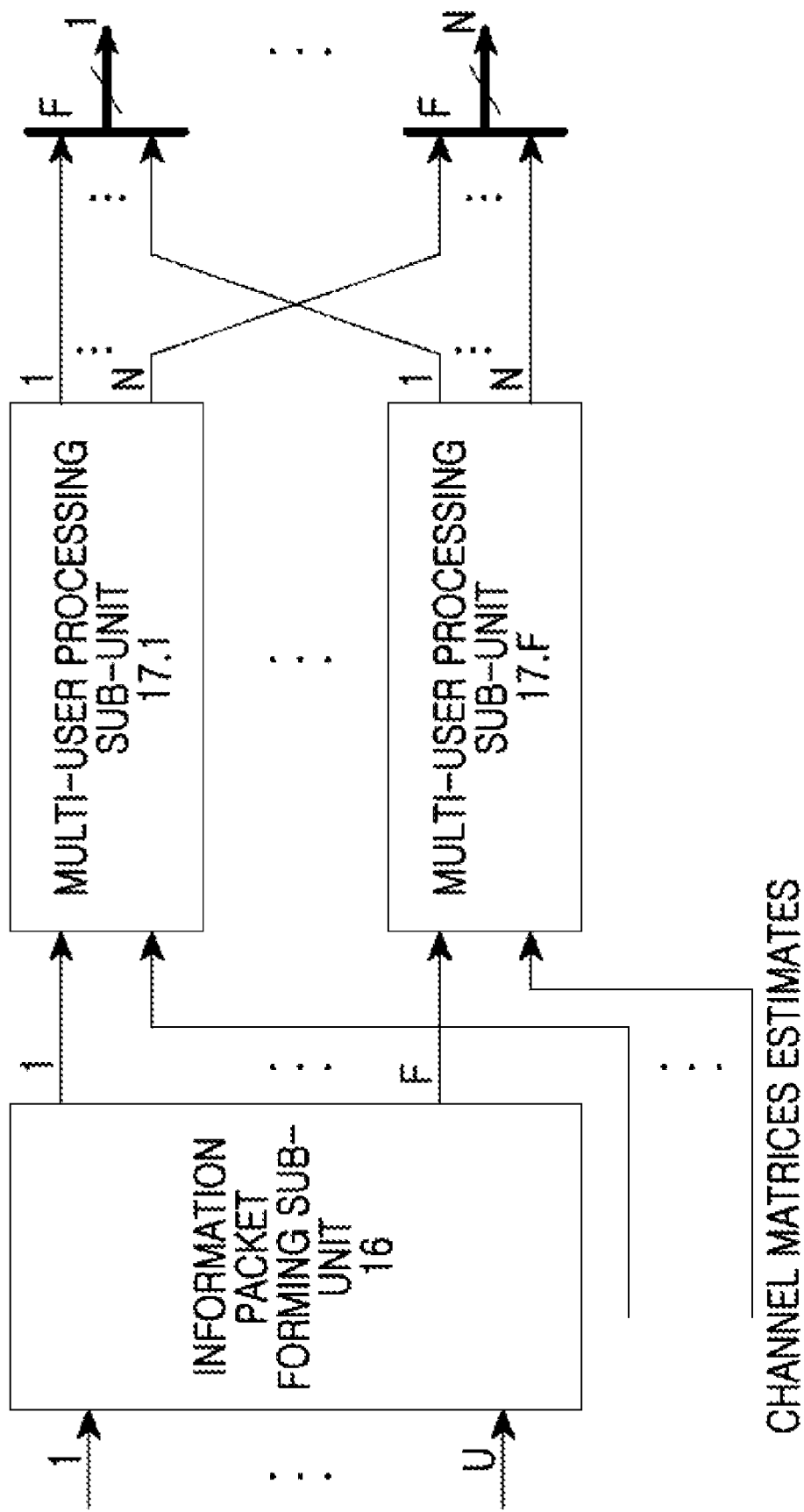
FIG. 3 is a block diagram of a signal forming unit for a group of joint service Subscriber Stations (SSs) according to an exemplary embodiment of the present invention.

FIG. 3 is a block diagram of a signal forming unit for a group of joint service subscriber stations according to an exemplary embodiment of the present invention.

Referring to FIG. 3, a signal forming unit for a group of joint service SSs consists of an information packet forming sub-unit 16 and F multi-user processing sub-units 17.1-17.F, where F is the number of frequency sub-channels dedicated for communication with subscribers of a group of joint service SSs. U inputs, received by an information packet forming sub-unit 16, represent the first inputs of the signal forming unit for a group of joint service SSs 11 and are inputs of information messages. F outputs of the information packet forming sub-unit 16 are connected with the first inputs of F multi-user processing sub-units 17.1-17.F, second inputs of which form the second inputs of the signal forming unit for a group of joint service SSs 11 and are inputs of channel matrix estimate signals. N outputs of each of F multi-user processing sub-units 17.1-17.F form outputs of the signal forming unit for groups of joint service SSs 11.

U information messages to be transmitted to U subscriber stations of the given subscriber group are applied from the first U inputs of forming unit 11 to the inputs of forming sub-unit 16. Sub-unit 16 forms F modulation symbol packet sequences from these messages. A sequence obtained at a separate output of sub-unit 16 is intended for transmission over a respective frequency sub-channel.

A modulation symbol packet sequence is fed from each of F outputs of information packet forming sub-unit 16 to the first input of respective multi-user processing sub-unit 17.1-17.F. A channel matrix estimate of the respective frequency sub-channel is applied to the second input of each multi-user processing sub-unit 17.1-17.F.

A signal to be transmitted via the n-th transmit antenna in the f-th frequency sub-channel is formed at each n-th output (n=1, ... N) of each f-th multi-user processing sub-unit (f= 1, ... F).

A set of signals thus formed at the outputs of multi-user processing sub-units 17.1-17.F is applied to a signal forming unit for groups of joint service SSs 11. This set of signals is applied from the outputs of forming units 11.1-11.M to the respective inputs of respective OFDM modulators 14.1-14.N, as illustrated in FIG. 2.

Figure 4:
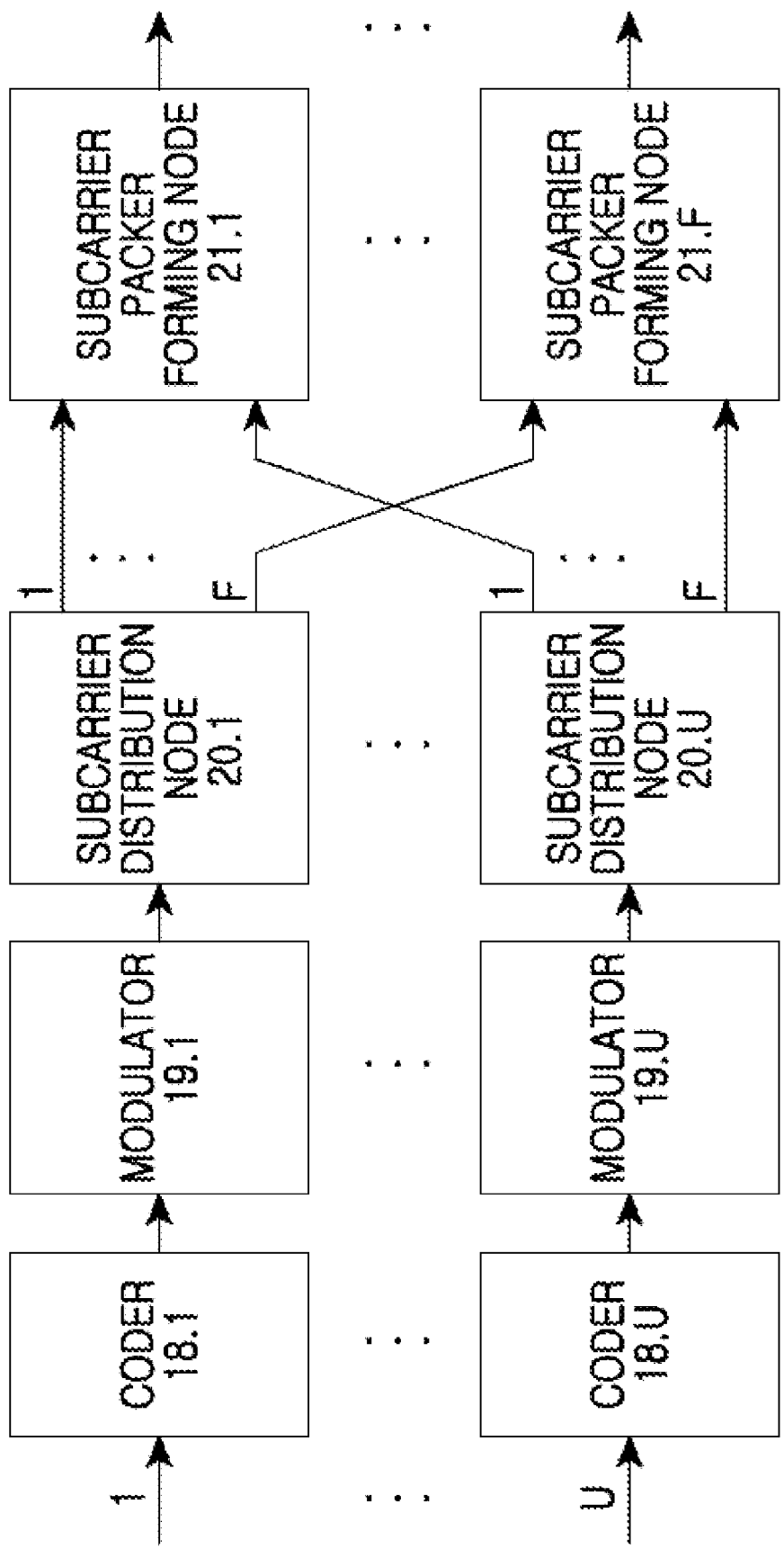
FIG. 4 is a block diagram of an information packet forming sub-unit according to an exemplary embodiment of the present invention.

FIG. 4 is a block diagram of an information packet forming sub-unit according to an exemplary embodiment of the present invention.

Referring to FIG. 4, the information packet forming sub-unit comprises U parallel signal processing channels, each containing a serially connected coder 18.1-18.U, a modulator 19.1-19.U, a subcarrier distribution structure 20.1-20.U, and F subcarrier packet forming structures 21.1-21.F, inputs of which are correspondingly connected with outputs of subcarrier distribution structures 20.1-20.U. Outputs of F sub-carrier packet forming structures 21.1-21.F are outputs of information packet forming sub-unit 16.

Each of U parallel signal processing channels processes a signal of one of U subscriber stations of a joint service SS group. U information sequences of binary symbols are applied to U inputs of information packet forming sub-unit 16, respectively. These sequences are fed from a BS control block, thus forming on the base of information messages to be transmitted to U subscriber stations.

In coder 18.1-18.0 of each of U processing channels, an input sequence of binary symbols is coded and interleaved. In modulator 19.1-19.U, the obtained coded binary symbol sequence is modulated. The coding, interleaving and modulation operations are performed by the selected coding and modulation types and interleaving algorithms stipulated by the communication standard in use (see, e.g., IEEE 802.16™ Standard for local and metropolitan area networks, Part 16: Air Interface for Fixed Broadband Wireless Access Systems, 1 Oct. 2004).

A sequence of modulation symbols generated at the output of modulator 19.1-19.0 is applied to the input of subcarrier distribution structure 20.1-20.U, where this sequence is distributed among F frequency sub-channels. Therefore, sequences of modulation symbols to be transmitted on the respective sub-carriers are generated at F outputs of structure 20.1-20.U.

The formed sub-sequences are fed from the outputs of structures 20.1-20.0 to the inputs of F subcarrier packet forming structures 21.1-21.F so that sub-sequences of different subscribers to be transmitted at the same subcarrier are applied to inputs of forming structures 21.1-21.F of the respective subcarrier.

Each of F packet forming structures 21.1-21.F generates a sequence of modulation symbol packets to be transmitted to the subscriber stations of the served group at the respective subcarrier.

These packets are formed in such a way that each packet comprises S modulation symbols, where S is a summed number of the receive antenna of the given group of subscriber stations. The number of symbols to be transmitted to each SS corresponds to the number of receive antenna at the respective SS. Each packet generated at the output of any of forming structures 21.1-21.F is represented as an S-dimensional vector of the transmitted modulation symbols $a=[a_1, \ldots a_S]^T$ in the course of further processing.

Modulation symbol packet sequences thus formed are fed from the outputs of F forming structures 21.1-21.F to outputs of information packet forming sub-unit 16.

Figure 5:
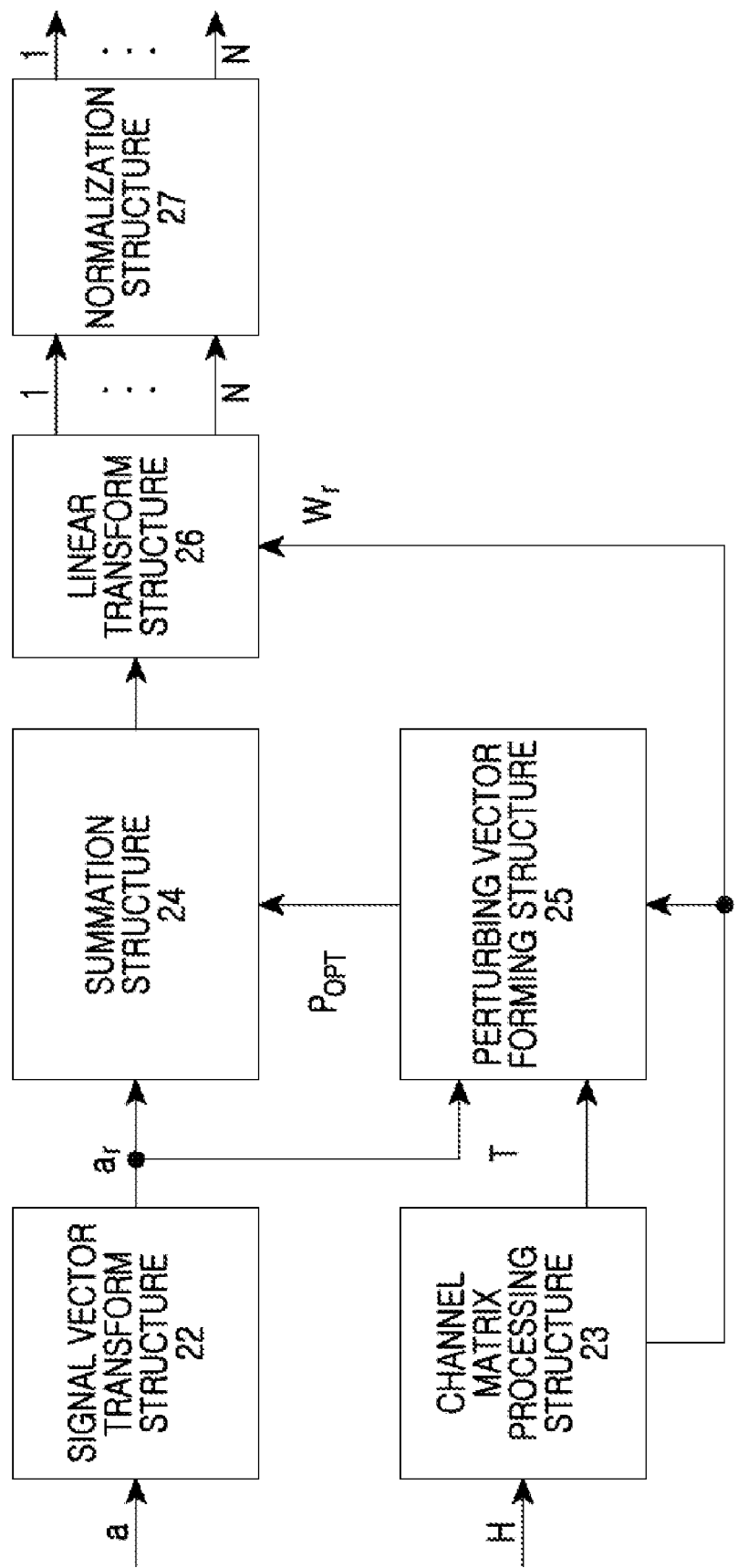
FIG. 5 is a block diagram of a multi-user processing unit according to an exemplary embodiment of the present invention.

FIG. 5 is a block diagram of a multi-user processing unit according to an exemplary embodiment of the present invention.

Referring to FIG. 5, each of multi-user processing sub-units 17.1-17.F consists of a signal vector transform structure 22, a channel matrix processing structure 23, a summation structure 24, a perturbing vector forming structure 25, a linear transform structure 26 and a normalization structure 27, wherein the first input of multi-user processing sub-unit 17 is an input of the signal vector transform structure 22, and the second input is an input of the channel matrix forming structure 23. An output of the signal vector transform structure 22 is connected with the first inputs of the summation structure 24 and the perturbing vector forming structure 25. The first output of the channel matrix processing structure 23 is connected with the second input of the perturbing vector forming structure 25, whose third input is combined with the second input of the linear transform structure 26 and is connected with the second output of the channel matrix processing structure 23. An output of the perturbing vector forming structure 25 is connected with the second input of the summation structure 24, output of which is connected with the third input of the linear transform structure 26, whose N outputs are connected with N inputs of the normalization structure 27, N outputs of which are outputs of the multi-user processing sub-unit 17.

An exemplary operation of the multi-user processing sub-unit 17 is disclosed below.

A sequence of vectors a of transmitted modulation symbols of one of frequency sub-channels formed at the respective output of the information packet forming sub-unit is fed from the first input of sub-unit 17 to the input of signal vector transform structure 22. In the signal vector transform structure 22, an S-dimensional vector of transmitted modulation symbols a is transformed to a 2S-dimensional real-valued vector of transmitted modulation symbols a, according to the formula:

$$a_r = \begin{bmatrix} \operatorname{Re} a \\ \operatorname{Im} a \end{bmatrix}, \qquad (36)$$

where Rea and Ima are vectors composed of real and respective imaginary elements of vector a. The obtained real-valued vector $a_r$ is simultaneously applied from the output of structure 22 to the first inputs of summation structure 24 and perturbing vector forming structure 25.

Channel matrix H of the respective frequency sub-channel is applied from the second input of structure 17 to the input of channel matrix processing structure 23.

Each element $h_{j,i}$ of the channel matrix is a coefficient estimate of signal transmission over a spatial channel formed by the i-th transmit antenna of the BS and the j-th receive antenna of the given SS group. This transmission coefficient is usually presented as a complex number whose modulo represents amplitude variation and its argument represents signal phase variation when passing over respective spatial channels.

There are various ways of estimating these coefficients. For instance, if a communication system uses time division duplexing, these estimates are generated at the BS by uplink signals received from SSs. If a communication system employs frequency division duplexing, estimates of channel matrix elements are produced in the SS receivers and transmitted to the BS over a feedback channel. Furthermore, other channel estimation techniques in a MIMO-OFDM system are known, as illustrated by Z. Jane Wang, Zhu Han, and K. J. Ray Liu, in "A MIMO-OFDM Channel Estimation Approach Using Time of Arrivals," IEEE TRANSACTIONS ON WIRELESS COMMUNICATIONS, VOL. 4, NO. 3, MAY 2005, pp. 1207-1213.

In the channel matrix processing structure 23, the algorithm described below may be implemented:

1) Channel matrix H of S×N size is transformed to real-valued matrix $H_r$ of 2S×2N size according to the formula $$H_r = \begin{bmatrix} \text{Re}H & -\text{Im}H \\ \text{Im}H & \text{Re}H \end{bmatrix}, \quad (37)$$

where ReH and ImH are matrices composed of real and imaginary parts of the respective elements of matrix H.

2) Real-valued matrix $H_r$ is used to form a linear pre-transform signal matrix by the formula:

$$W_r = (H_r^H H_r)^{-1} H_r^H, \quad (38)$$

where $(.)^H$ denotes a transposition and complex conjugation symbol, and $(.)^{-1}$ is a matrix inversion symbol. Matrix $W_r$ is applied to the first output of the channel matrix processing structure 23 and then to the second input of the linear transform structure 26 and the third input of the perturbing vector forming structure 25.

3) By performing the matrix $W_r$ lattice basis reduction, an integer-valued matrix T with a determinant equal to ±1 is formed in such a way that multiplication by T transforms the linear multi-user transformation matrix into matrix $Z=W_r T$, which has a low condition value.

In this case, a lattice basis reduction algorithm called LLL (Lenstra-Lenstra-Lovasz) may be used. The LLL algorithm is disclosed by Dirk Wubben, Ronald Böhnke, Volker Kühn, and Karl-Dirk Kammeyer, in "Near-Maximum-Likelihood Detection of MIMO Systems using MMSE-Based Lattice Reduction," IEEE Proc. International Conference on Communications (ICC), Paris, France, June 2004 and by A. K. Lenstra, H. W. Lenstra, and L. Lovasz, in "Factoring polynomials with rational coefficients," Mathematische Annalen, vol. 261, pp. 515-534, 1982.

Matrix T thus formed is applied from the first output of the channel matrix processing structure 23 to the second input of the perturbing vector forming structure 25.

The perturbing vector forming structure 25 executes the search for an optimal perturbing vector $p_{opt}$.

According to an exemplary embodiment of the present invention, auxiliary vector $q_0$ is formed, which determines an initial search point. Then, two optimized auxiliary vectors $q_1$ and $q_2$ are formed using the above vector. The vectors $q_1$ and $q_2$ are used to form a multitude of candidate vectors. Vector $q_{opt}$ minimizing the transmitted signal power is selected from the multitude of candidate vectors. Optimal perturbing vector $p_{opt}$ is generated from vector $q_{opt}$.

An exemplary embodiment of the procedure is described below. However, it is to be understood that other variants of this procedure are not excluded.

1. Matrix T and real-valued vector of transmitted modulation symbols $a_r$ are used to determine an auxiliary vector as follows:

$$q_0 = -Q(T^{-1} \cdot a_r / A) \quad (39)$$

where Q(x) is a vector derived from vector x by rounding its elements up to the nearest integers, and A is a real number such that real and imaginary parts of any modulation symbol do not exceed A/2 by the absolute value, 2. Two optimized vectors $q_1$ and $q_2$ are determined in the following manner:

2a. Initial values of the first and second optimized vectors are set to $q_1 = q_2 = q_0$. The vector coordinate counter is set to 1: j=1.

2b. Two step values $\lambda_1$ and $\lambda_2$ of j-th coordinate variation of vector $q_0$ are defined, which correspond to two least values of the following decision function:

$$F_j(\lambda) = \|W_r \cdot (a_r + A \cdot T \cdot (q_1 + \lambda \cdot e_j))\|^2, \quad (40)$$

where $e_j$ denotes a 2S-dimensional vector, all of whose elements are zero except the j-th element being equal to 1. $F_j(\lambda_1) \leq F_j(\lambda_2)$ and step values are selected from the limited multitude of integers: $\lambda \in \square_{lim}$, e.g., $\square_{lim} = \{-1, 0, 1\}$.

2c. Respective decision function values are saved, for example, as the j-th coordinates of the first $F_1$ and second $F_2$ vectors of decision function values:

$$F_1(j) = F_j(\mu_1), F_2(j) = F_j(\mu_2), \quad (41)$$

2d. $\lambda_1$ and $\lambda_2$ are used to determine the first and second optimized vectors as:

$$q_1 = q_1 + \lambda_1 \cdot e_j, q_2 = q_2 + \lambda_2 \cdot e_j, \quad (42)$$

where, in the right parts, vectors $q_1$ and $q_2$, obtained after optimization of the j-1-th coordinate, are used starting from j=2, 2e. The counter of coordinate j is compared with the maximum number 2N. If j<2N, j is incremented by 1 and the procedure returns to step 2b. If j=2N, the determination procedure of optimized vectors $q_1, q_2$ is completed.

3. Elements of the first and second optimized vectors $q_1, q_2$ are used to form a multitude of candidate vectors as follows:

3a. Initially, a multitude of candidate vectors is determined as a multitude that is composed of the first optimized vector CandVec={$q_1$}. The vector coordinate counter is set to 1: j=1.

3b. Values of decision functions $F_2(j)$ and $F_1(j)$ are compared. If the absolute value of their difference does not exceed a certain threshold $|F_2(j)-F_1(j)| \leq$ Thresh, the j-th elements of all vectors of multitude CandVec are replaced by the j-th element $q_2$ and the obtained vector multitude is comprised of the multitude of candidate vectors CandVec. In an opposite case wherein ($|F_2(j)-F_1(j)|>$Thresh), the next step (3c) is started. The threshold is determined for example as:

$$\text{Thresh} = \alpha \cdot F_1(j), \quad (43)$$

where α is a constant, e.g., α=0.5,

3c. The coordinate counter j is compared with the maximum number 2N. If j<2N, j is incremented by 1 and the procedure returns to step 3b, otherwise formation of the candidate vector multitude is completed.

4. The optimal perturbing vector is determined as:

$$p_{opt} = A \cdot T \cdot q_{opt}, \quad (44)$$

where $$q_{opt} = arg \min_{q \in CandVec} \|W_r \cdot (a_r + A \cdot T \cdot q)\|^2. \quad (45)$$

The formed optimal perturbing vector $p_{opt}$ is applied from the output of the perturbing vector forming structure 25 to the second input of the summation structure 24 where the real-valued transmitted symbol vector is summed with the optimal perturbing vector, thus forming a real-valued vector of transmitted symbols $(a_r + p_{opt})$.

The real-valued vector of transmitted symbols is applied from the output of summation structure 24 to the first input of the linear transform structure 26.

The linear transform structure 26 performs linear pre-transformation of the obtained real-valued vector of modulation symbols, thus forming a real-valued vector of transmitted signals by the formula:

$$x_r = W_r(a_r + p_{opt}), \quad (46)$$

The obtained real-valued vector of transmitted signals $x_r$ is used to produce a non-normalized vector of transmitted signals in structure 26:

$$x_0 = x_r(1:N) + j \cdot x_r(N+1:2N), \quad (47)$$

where j is an imaginary unit, and $x_r(n:m)$ denotes a vector composed of sequential elements of vector $x_r$ from the n-th to the m-th elements.

Therefore, N elements of the non-normalized vector of transmitted signals are formed at N outputs of the linear transform structure 26. These signals are fed from outputs of the linear transform structure 26 to the respective inputs of the normalization structure 27 where a vector of transmitted signals of the given frequency subchannel is formed by multiplying non-normalized signals by normalization coefficient $C_T$, $$x = x_0 \cdot C_T \quad (48)$$

Normalization coefficient $C_T$ is a real number selected such that the average signal transmission power of formed vector x equals the power of signals transmitted without multi-user transformation. These could be for example pilot signals used to estimate a receive side channel.

A set of signals corresponding to elements of an obtained vector is applied to the outputs of the normalization structure 27 and to the outputs of the multi-user processing sub-unit 17, respectively. The set of signals corresponding to elements of an obtained vector is transmitted in a respective frequency sub-channel over all transmit antennas, one signal per antenna. For this purpose formed signals are applied to inputs of an OFDM modulator.

For reference, functions of OFDM modulators 14.1-14.N are disclosed above in the description of an exemplary embodiment of a BS transmitter.

Figure 6:
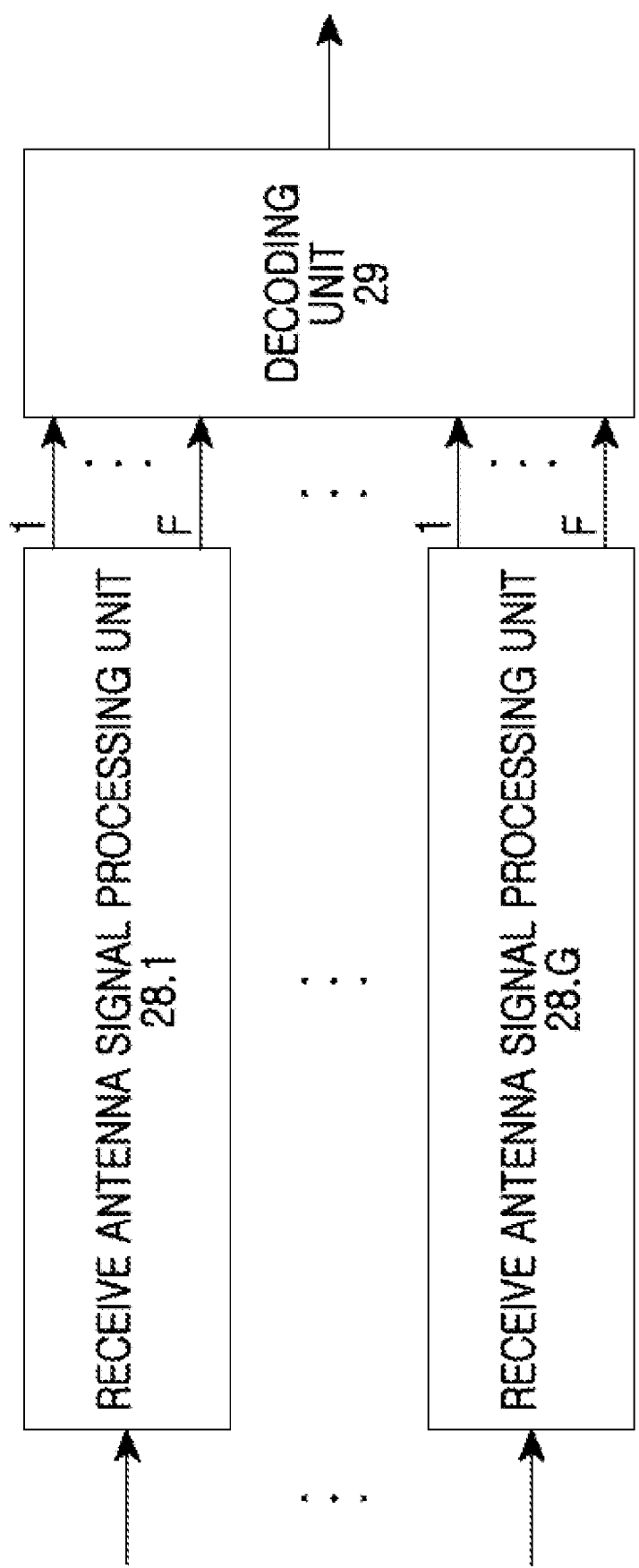
FIG. 6 is a block diagram of an SS receiver according to an exemplary embodiment of the present invention.

FIG. 6 is a block diagram of an SS receiver according to an exemplary embodiment of the present invention.

Referring to FIG. 6, the SS receiver comprises G receive antennas (not shown), the same number of receive antenna signal processing units 28.1-28.G, and a decoding unit 29. Inputs of the receive antenna signal processing units 28.1-28.G constitute inputs of the SS receiver. F outputs of each of the receive antenna signal processing units 28.1-28.G are connected with their respective inputs of the decoding unit 29, whose output is an output of the SS receiver.

A signal is applied from each of the G receive antennas of the SS receiver to the input of the respective signal processing unit 28.1-28.G. Each of signal processing units 28.1-28.G processes the signal resulting in F binary symbol sequences received by the respective receive antenna on F frequency subcarriers.

Figure 7:
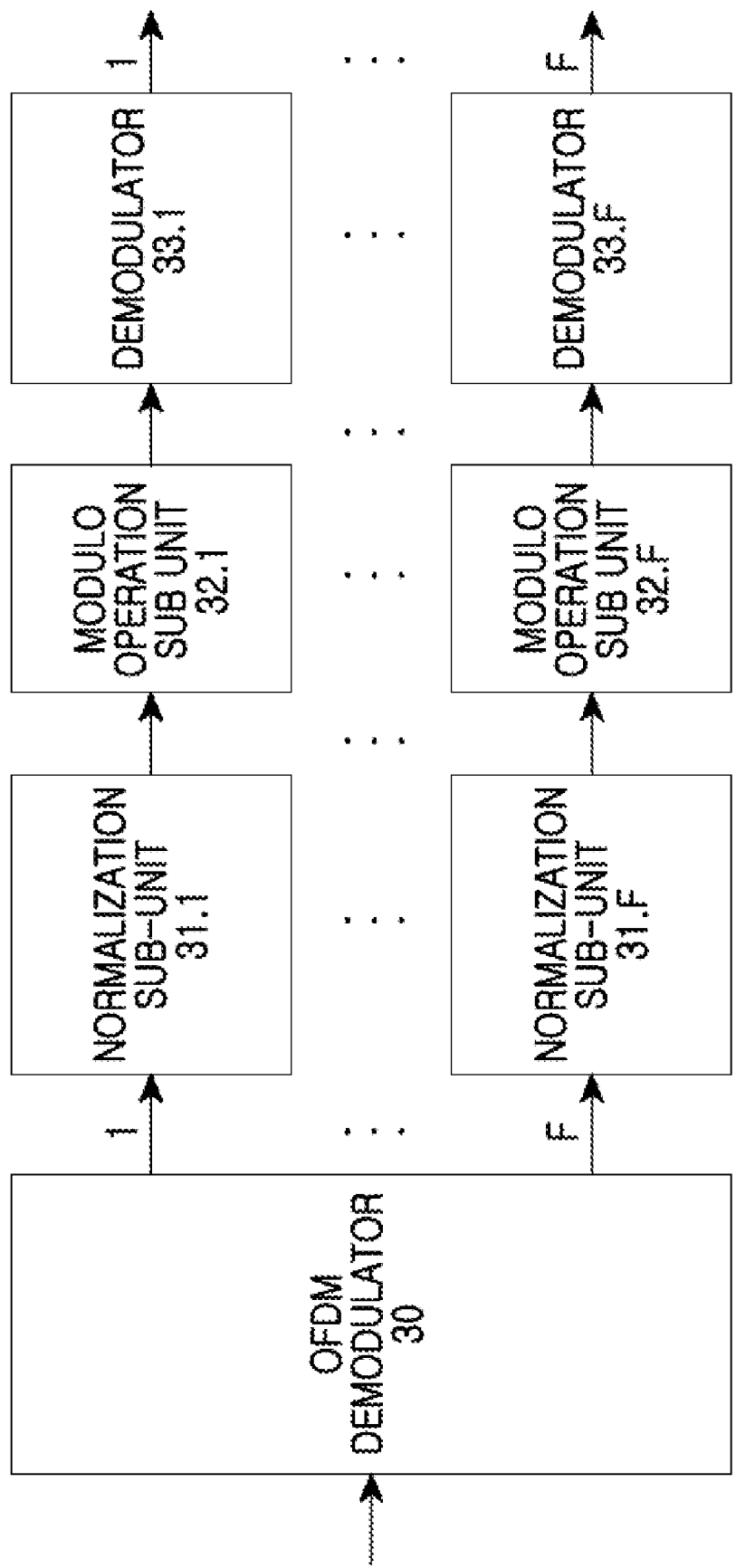
FIG. 7 is a block-diagram of a receive antenna signal processing unit according to an exemplary embodiment of the present invention.

FIG. 7 is a block diagram of a receive antenna signal processing unit according to an exemplary embodiment of the present invention.

Referring to FIG. 7, each receive antenna signal processing unit 28.1-28.G comprises an OFDM demodulator 30, F normalization sub-units 31.1-31.F, and the same number of modulo operation sub-units 32.1-32.F and demodulators 33.1-33.F. An input of the OFDM demodulator 30 is an input of receive antenna signal processing unit 28, F outputs of the OFDM demodulator 30 are connected with inputs of their respective normalization sub-units 31.1-31.F whose outputs are correspondingly connected with inputs of the F modulo operation sub-units 32.1-32.F, outputs of which are connected with inputs of the F demodulators 33.1-33.F, outputs of which are outputs of the receive antenna signal processing unit 28.

OFDM demodulator 30 executes RF signal processing, OFDM signal synchronization, cyclic prefix rejection and discrete Fourier transformation resulting in signals of F frequency subcarriers. An example of OFDM signal demodulation operations are illustrated by John G. Proakis in "Digital Communication," McGraw-Hill, Third Edition.

Therefore, at each of F outputs of OFDM demodulator 30 is formed the signal y being a complex number with an absolute value and an argument corresponding to the amplitude and phase of the signal received in the given frequency subchannel.

A signal of each of F frequency subchannels are independently processed in the respective processing subchannel comprising serially connected normalization sub-unit 31, modulo operation sub-unit 32 and demodulator 33.

In each processing subchannel of each receive antenna the following operations are performed.

In normalization sub-unit 31, the signal y is normalized by multiplying it by the normalization coefficient $C_R$, thus forming a normalized signal:

$$y_{norm} = y \cdot C_R, \quad (49)$$

where the normalization coefficient $C_R$ is set to be equal to an inverse value of the transmission normalization coefficient:

$$C_R = \frac{1}{C_T}.$$

In the SS receiver, the coefficient $C_R$ is determined for example by means of pilot signals transmitted simultaneously with information signals.

Real and imaginary parts of the normalized signal $y_{norm}$ are determined in the modulo operation sub-unit 32:

$$z = Re y_{norm}, \quad c = Im y_{norm} \quad (50)$$

The obtained signals $\tilde{z}$ and $\tilde{c}$ are used to perform a non-linear modulo operation in sub-unit 32 wherein the modulo equals A:

$$\tilde{z} = z - A \left\lfloor \frac{z + A/2}{A} \right\rfloor \quad (51)$$

$$\tilde{c} = c - A \left\lfloor \frac{c + A/2}{A} \right\rfloor,$$

where $\lfloor x \rfloor$ is an integer part of x, i.e. the maximum integer less than x.

The signals $\tilde{z}$ and $\tilde{c}$ are used to form the complex signal $\tilde{y}=\tilde{z}+j\tilde{c}$ applying to the output of the modulo operation subunit 32 and then to the input of the demodulator 33.

The demodulator 33 demodulates the complex signal using a conventional technique, thus forming a sequence of received binary symbol estimates.

Thus formed sequences of binary symbol estimates received in F frequency subchannels are applied from the outputs of the demodulators 33.1-33.F to the outputs of the receive antenna signal processing unit 28 and then to their respective inputs of decoding unit 29.

Therefore, the formed sequences (for example as illustrated in FIG. 6) are fed from F outputs of each of units 28.1-28.G to their respective inputs of decoding unit 29, where the sequences of binary symbol estimates are combined, deinterleaved and decoded inversely to those operations used in one of the coding structures 18.1-18.0 of transmitter 2 of BS 1 (for example as illustrated in FIG. 4).

Hence, a sequence of received message binary symbols is formed at the output of decoder unit 29 of the SS receiver.

Performance Estimation

Computer simulation was conducted to estimate interference stability performance of the signal transmission-reception algorithm according to the claimed method.

A transmitter software model comprising N=4 antennas and four SS receivers equipped with one receive antenna each was developed.

The developed model corresponds to one group of joint service SSs. The model structure is disclosed above and illustrated in FIGS. 1 through 7.

For simplicity, the software model employs only one physical (frequency) channel for signal transmission-reception in a multi-user MIMO radio communication system.

Figure 8:
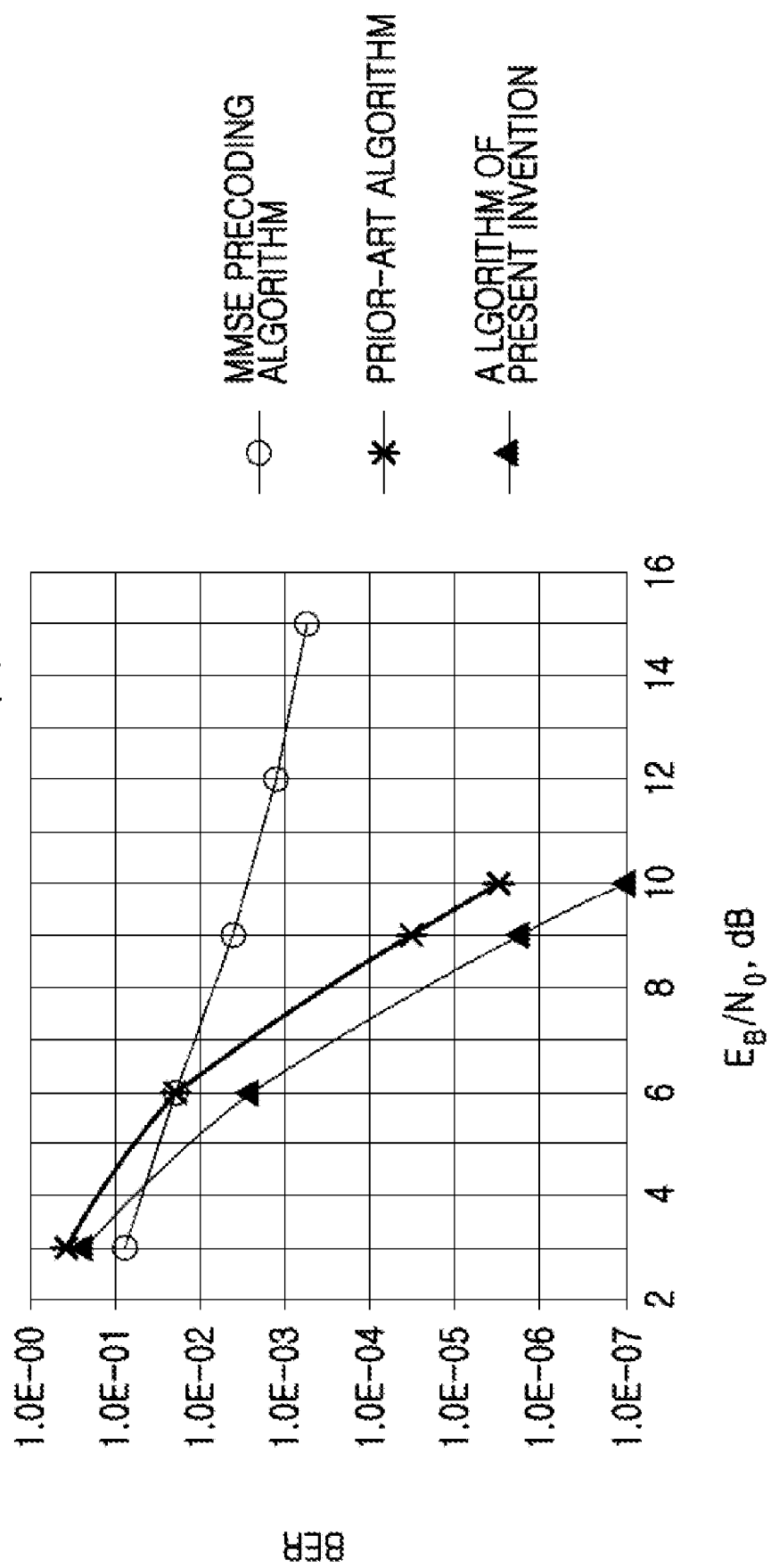
FIG. 8 illustrates simulation results of multi user, Multiple Input Multiple Output MIMO algorithms for 8 bit/sec/Hz total spectral efficiency according to an exemplary embodiment of the present invention.

FIG. 8 illustrates simulation results of multi-user MIMO algorithms for 8 bit/sec/Hz total spectral efficiency according to an exemplary embodiment of the present invention.

The curves of the diagrams denote Bit Error Rate (BER) as a function of $E_B/N_0$, where BER denotes a probability of signal bit reception error averaged over all subscriber stations, $E_B/N_0$ is average energy per bit $E_B$ to noise spectral density $N_0$ ratio at the reception point. It is assumed that the reception conditions and data rates are the same for all SSs.

During simulation, convolutional coding with ½ coding rate and 192 bits block of raw binary symbols was used. The channel model with block fading and additive Gaussian noise was employed.

The following algorithms, such as MMSE precoding algorithm, Prior art algorithm, and Algorithm claimed, were simulated for 4 subscriber stations, each having 1 receive antenna. 16 Quadrature Amplitude Modulation (QAM) was used to transmit the signal of each SS.

The demonstrated performance illustrates that in the effective range of BER (BER<=0.05), the algorithm according to an exemplary embodiment of the present invention has the best performance compared to other algorithms under consideration.

Therefore, according to exemplary embodiments of the present invention, reception in a multi-user multiple transmit and multiple receive antenna allows significantly increased throughput of the multi-user MIMO communication system by providing joint service to a group of multiple subscriber stations in the same physical channel.

Interference stability of the algorithm implementing the claimed method outperforms the known MIMO algorithms as illustrated by Q. H. Spencer, and M. Haardt, in "Capacity and Downlink Transmission Algorithms for a Multi-user MIMO Channel," Signals, Systems and Computers, 2002. Conference Record of the Thirty-Sixth Asilomar Conference, Volume 2, Issue, 3-6 Nov. 2002 Page(s): 1384-1388, J. C. Mundarath, and J. H. Kotecha, in "Zero-Forcing Beamforming for Non-Collaborative Space Division Multiple Access," Proceedings of 2006 IEEE International Conference on Acoustics, Speech and Signal Processing ICASSP, 14-19 May 2006, Volume: 4, page(s): IV-IV, A Wiesel, Y. C. Eldar, and Sh. Shamai, in "Optimal Generalized Inverses for Zero Forcing Precoding," 41st Annual Conference on Information Sciences and Systems, CISS '07, 14-16 Mar. 2007, pages: 130-134, as well as the algorithm which serves as the prior art and disclosed by Christoph Windpassinger, Robert F. H. Fischer, and Johannes B. Huber, in "Lattice-Reduction-Aided Broadcast Precoding," IEEE TRANSACTIONS ON COMMUNICATIONS, VOL. 52, NO. 12, DECEMBER 2004, pp. 2057-2060.

Through exemplary embodiments of the present invention, performance enhancement and throughput increase are achieved by using a new sequence of operations including a vector perturbation procedure along with an efficient perturbing vector search method based on single-dimensional optimization of the decision function.

In addition, an advantage according to an exemplary embodiment of the present invention is simple implementation of the SS receiver. The SS receiver is implemented as independent channels for processing signals of different receive antennas.

Another advantage according to an exemplary embodiment of the present invention is that it can be implemented even if each SS has only one receive antenna.

Yet another benefit according to an exemplary embodiment of the present invention is that it is highly efficient in almost any propagation environment. Note that to increase throughput based on conventional single-user MIMO methods, the propagation environment should provide minimum correlation between spatial channels corresponding to different antennas. This is not always implemented in practice especially if antennas of some communication side are too close or the propagation environment has low scattering.

At the same time, a method according to an exemplary embodiment of the present invention offers a throughput gain even in a relatively low-scattering environment because the receiver side antennas belong to different subscriber terminals. As a result, their signals have low correlation regardless of the propagation environment properties.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for signal communication in a multi-user radio communication system including a transmit station, having N>1 transmit antennas, and U≧2 receive stations, each receive station having at least one receive antenna and the summed number S of receive antennas of receive stations satisfies 1<S≦N, wherein signals are transmitted-received by means of F≧1 physical channels, the method comprising:
   estimating transfer coefficients of all possible spatial communication channels respectively; and
   transmitting signals by the transmit station and receiving signals by receive stations using F physical channels,
   wherein the step of transmitting signals by the transmit station comprises:

forming a channel matrix H of the physical channel using estimates of spatial channel transfer coefficients;

forming a real-valued vector $a_r$ and matrix $H_r$ using a transmitted modulation symbol vector a and the channel matrix H;

forming a linear multi-user transformation matrix $W_r$ using the real-valued vector $a_r$;

generating a perturbed real-valued vector of transmitted modulation symbols by adding the real-valued transmitted modulation symbols vector to an optimal perturbing vector;

determining the optimal perturbing vector in such a way as to minimize the transmitted signal power;

forming a vector of transmitted signals x by multiplying a non-normalized transmitted signals vector $x_0$ by a normalizing coefficient $C_T$; and transmitting a set of signals corresponding to the elements of the obtained vector x over an appropriate physical channel via all transmit antennas, wherein the step of receiving signals by receive stations comprises:

receiving signals at each of U receive stations in a physical channel of each receive antenna;

wherein the reception is carried out in such a way that a signal y is formed as a complex number with a modulo and an argument corresponding to the amplitude and phase of the signal received by this physical channel;

normalizing signal y by multiplying it by a normalizing coefficient $C_R$, thus forming a normalized signal $y_{norm} = y \cdot C_R$;

obtaining real and imaginary parts of the normalized signal $y_{norm}$ as $$z = Re\, y_{norm},\ c = Im\, y_{norm},$$

performing a modulo operation by modulo A for resulting signals z and c;

$$\tilde{z} = z - A \left\lfloor \frac{z + A/2}{A} \right\rfloor$$

$$\tilde{c} = c - A \left\lfloor \frac{c + A/2}{A} \right\rfloor,$$

where $\lfloor x \rfloor$ is an integer part of x, comprising the maximum integer less than x, the signals $\tilde{z}$ and $\tilde{c}$ are used to form a complex signal $$\tilde{y} = \tilde{z} + j\tilde{c},\ \text{and}$$

forming values of a complex signal $\tilde{y}$ in each physical channel of each receive antenna are used to demodulate and decode the received signal.

2. The method of claim 1, wherein the modulation symbols of the transmit station are generated so that each of U information messages to be transmitted to U receive stations are correspondingly represented as a sequence of binary symbols and the binary symbols of the said sequence are coded, interleaved and modulated.

3. The method of claim 1, wherein the linear multi-user transformation matrix $W_r$ is formed as $$W_r = (H_r^H H_r)^{-1} H_r^H$$

where $H_r$ is a real-valued channel matrix of the respective physical channel.

4. The method of claim 1, wherein the optimal perturbing vector is selected among a set of vectors p, elements of which includes a multiple of a real number A, selected in such a way that the absolute value of real and imaginary parts of any modulation symbol would not exceed A/2;

wherein, the determination for the optimal perturbing vector is performed in such a way that the vector $a_r$ and matrix $W_r$ are used to form an auxiliary vector $q_0$ which determines the initial search point so that vector $A \cdot q_0$ belongs to the set of perturbing vectors p;

for each coordinate of auxiliary vector $q_0$ an optimal variation step value is sequentially calculated, which provides a maximum degree of transmitted signal power reduction, a suboptimal step value is also calculated, which provides the lower degree of transmitted signal power reduction;

a first optimized vector $q_1$ is formed by adding the optimal value of the respective coordinate variation step to each coordinate of the auxiliary vector $q_0$;

a second optimized vector $q_2$ is formed by adding the suboptimal value of the respective coordinate variation step to each coordinate of auxiliary vector $q_0$;

the first $q_1$ and the second $q_2$ optimized vectors are used to form a set of candidate vectors including the vectors each coordinate of which is a respective coordinate of the first $q_1$ or the second $q_2$ optimized vector, and each of these vectors is included in the candidate vector set considering the transmitted signal power corresponding to this vector;

the real-valued vector $a_r$ and linear multi-user transformation matrix $W_r$ are used to determine an optimal auxiliary vector $q_{opt}$ as a vector of the candidate vector set providing minimum transmitted signal power; and the optimal auxiliary vector $q_{opt}$, the value A and matrix $W_r$ are used to form an optimal perturbing vector $p_{opt}$, thus completing the determination for the optimal perturbing vector.

5. The method of claim 4, wherein an auxiliary vector $q_0$, which determines the search start is formed in such a way that by performing the matrix $W_r$ lattice basis reduction, an integer-valued matrix T with a determinant equal to ±1 is formed so that multiplication by T transforms the multi-user transformation matrix into a matrix $Z = W_r T$ which has a low condition value and wherein the matrix T and the real-valued vector of transmitted modulation symbols $a_r$ are used to calculate an auxiliary vector as $$q_0 = -Q(T^{-1} \cdot a_r / A),$$

where Q(x) is a vector obtained from vector x by rounding its elements to the closest integers.

6. The method of claim 4, wherein, in forming the first $q_1$ and the second $q_2$ optimized auxiliary vectors, the degree of transmission power reduction due to changing the j-th vector coordinate is determined based on the degree of decision function reduction $$F_j(\lambda) = \|W_r \cdot (a_r + A \cdot T \cdot (q_1 + \lambda \cdot e_j))\|^2,$$

where $e_j$ is a 2N-dimensional vector, the j-th coordinate of which equals 1 and the remaining coordinates are zero.

7. The method of claim 4, wherein, in forming the first $x_1$ and the second $X_2$ optimized vectors, the step value is selected from the multitude of $\{-1, 0, 1\}$.

8. The method of claim 4, wherein, when the optimal auxiliary vector is determined, the transmitted signal power is estimated by $\|W_r \cdot (a_r + A \cdot T \cdot q)\|^2$.

9. The method of claim 4, wherein the optimal perturbing vector $p_{opt}$ is formed using the optimal auxiliary vector $q_{opt}$, the value A and matrix $W_r$ by the formula $$p_{opt} = A \cdot T \cdot q_{opt},$$

where T is an integer-valued matrix with the determinant equal to ±1, multiplication by which transforms the matrix $W_r$ into the matrix $Z = W_r T$, which has a certain low condition value.

10. The method of claim 1, wherein, in forming a transmitted signal vector, the normalizing coefficient $C_T$ is selected in such a way that the average transmit power of the formed vector x is equal to the power of signals transmitted by the receive stations without multi-user transformation.

11. The method of claim 1, wherein the normalizing coefficient $C_R$ is set to equal the inverse value of the normalizing transfer coefficient:

$$C_R = \frac{1}{C_T}.$$

12. The method of claim 1, wherein the spatial communication channels is formed by one transmit antenna of the transmit station and one receive antenna of a receive station for each of F physical channels.

13. The method of claim 1, wherein, at the transmit station, U respective sets of modulation symbols are generated from U information messages to be transmitted to U receive stations, the resulting modulation symbol sets are used to generate F packets each having S modulation symbols, where $S_k$ modulation symbols are included in each packet for each k-th receive station, and $S_k$ is the number of receive antennas of the k-th receive station.

14. The method of claim 1, wherein, each of F modulation symbol packets are transmitted over a corresponding physical channel in such a way that each modulation symbol is represented by a complex number a, and a modulation symbol packet is represented as a vector of transmitted modulation symbol $a = [a_1 \ldots a_S]^T$.

15. The method of claim 1, wherein the real-valued vector $a_r$ and the matrix $H_r$ are formed as $$a_r = \begin{bmatrix} \mathrm{Re}\,a \\ \mathrm{Im}\,a \end{bmatrix}, H_r = \begin{bmatrix} \mathrm{Re}H & -\mathrm{Im}H \\ \mathrm{Im}H & \mathrm{Re}H \end{bmatrix},$$

where ReH, ImH are matrices made up of real and imaginary parts of the respective elements of the matrix H.

16. The method of claim 1, wherein the resulting vector is subjected to multi-user transformation thereby providing a real-valued transmitted signal vector as $$x_r == W_r(a_r + p_{opt}),$$

the resulting vector $x_r$ is used to obtain the non-normalized transmitted signal vector $$x_0 = x_r(1:N) + j \cdot x_r(N+1:2N),$$

where j is an imaginary unit, and $x_r(n:m)$ denotes a vector comprising a sequence of $x_r$ vector elements from the n-th to the m-th.

17. A multi-user radio communication system, wherein— the multi-user radio communication system includes a transmit station, having N>1 transmit antennas, and U≧2 receive stations, each receive station having at least one receive antenna and the summed number S of receive antennas of receive stations satisfies 1<S≦N, wherein signals are transmitted-received by means of F≧1 physical channels, comprising:
the transmit station for estimating transfer coefficients of all possible spatial communication channels respectively and transmitting signals; and
receive stations for receiving signals using F physical channels, wherein the transmit station comprises:

a control block for forming a channel matrix H of the physical channel using estimates of spatial channel transfer coefficients;
a signal forming unit for forming a real-valued vector $a_r$ and matrix $H_r$ using a transmitted modulation symbol vector a and the channel matrix H, forming a linear multi-user transformation matrix $W_r$ using the real-valued vector $a_r$, generating a perturbed real-valued vector of transmitted modulation symbols by adding the real-valued transmitted modulation symbols vector to an optimal perturbing vector, and determining the optimal perturbing vector in such a way as to minimize the transmitted signal power; and
an OFDM modulator for forming a vector of transmitted signals x by multiplying a non-normalized transmitted signals vector $x_0$ by a normalizing coefficient $C_T$, and transmitting a set of signals corresponding to the elements of the obtained vector x over an appropriate physical channel via all transmit antennas, wherein each U receive station comprises:
an OFDM demodulator for receiving signals in a physical channel of each receive antenna;
wherein the reception is carried out in such a way that a signal y is formed as a complex number with a modulo and an argument corresponding to the amplitude and phase of the signal received by this physical channel;
normalization sub-units for normalizing signal y by multiplying it by a normalizing coefficient $C_R$, thus forming a normalized signal $y_{norm} = y \cdot C_R$;
modulo operation sub-units for obtaining real and imaginary parts of the normalized signal $y_{norm}$ as
z=Re $y_{norm}$, c=Im $y_{norm}$, and performing a modulo operation by modulo A for resulting signals z and c;

$$\tilde{z} = z - A \left\lfloor \frac{z + A/2}{A} \right\rfloor$$

$$\tilde{c} = c - A \left\lfloor \frac{c + A/2}{A} \right\rfloor,$$

where $\lfloor x \rfloor$ is an integer part of x comprising the maximum integer less than x,
the signals $\tilde{z}$ and $\tilde{c}$ are used to form a complex signal $$\tilde{y} = \tilde{z} + j\tilde{c}, \text{ and}$$

demodulators for forming values of a complex signal $\tilde{y}$ in each physical channel of each receive antenna are used to demodulate and decode the received signal.

18. The multi-user radio communication system of claim 17, wherein the modulation symbols of the transmit station are generated so that each of U information messages to be transmitted to U receive stations are correspondingly represented as a sequence of binary symbols and the binary symbols of the said sequence are coded, interleaved and modulated.

19. The multi-user radio communication system of claim 17, wherein the linear multi-user transformation matrix $W_r$ is formed as $$W_r = (H_r^H H_r)^{-1} H_r^H$$

where $H_r$ is a real-valued channel matrix of the respective physical channel.

20. The multi-user radio communication system of claim 17, wherein, the optimal perturbing vector is selected among a set of vectors p, elements of which includes a multiple of a real number A, selected in such a way that the absolute value of real and imaginary parts of any modulation symbol would not exceed A/2;

wherein, the determination for the optimal perturbing vector is performed in such a way that the vector $a_r$ and matrix $W_r$ are used to form an auxiliary vector $q_0$ which determines the initial search point so that vector $A \cdot q_0$ belongs to the set of perturbing vectors p;

for each coordinate of auxiliary vector $q_0$ an optimal variation step value is sequentially calculated, which provides a maximum degree of transmitted signal power reduction, a suboptimal step value is also calculated, which provides the lower degree of transmitted signal power reduction;

a first optimized vector $q_1$ is formed by adding the optimal value of the respective coordinate variation step to each coordinate of the auxiliary vector $q_0$;

a second optimized vector $q_2$ is formed by adding the suboptimal value of the respective coordinate variation step to each coordinate of auxiliary vector $q_0$;

the first $q_1$ and the second $q_2$ optimized vectors are used to form a set of candidate vectors including the vectors each coordinate of which is a respective coordinate of the first $q_1$ or the second $q_2$ optimized vector, and each of these vectors is included in the candidate vector set considering the transmitted signal power corresponding to this vector;

the real-valued vector $a_r$ and linear multi-user transformation matrix $W_r$ are used to determine an optimal auxiliary vector $q_{opt}$ as a vector of the candidate vector set providing minimum transmitted signal power; and the optimal auxiliary vector $q_{opt}$, the value A and matrix $W_r$ are used to form an optimal perturbing vector $p_{opt}$, thus completing the determination for the optimal perturbing vector.

21. The multi-user radio communication system of claim 17, wherein an auxiliary vector $q_0$, which determines the search start is formed in such a way that by performing the matrix $W_r$ lattice basis reduction, an integer-valued matrix T with a determinant equal to ±1 is formed so that multiplication by T transforms the multi-user transformation matrix into a matrix $Z=W_r T$ which has a low condition value and wherein the matrix T and the real-valued vector of transmitted modulation symbols $a_r$ are used to calculate an auxiliary vector as $$q_0 = -Q(T^{-1} \cdot a_r / A),$$

where $Q(x)$ is a vector obtained from vector x by rounding its elements to the closest integers.

22. The multi-user radio communication system of claim 21, wherein, in forming the first $q_1$ and the second $q_2$ optimized auxiliary vectors, the degree of transmission power reduction due to changing the j-th vector coordinate is determined based on the degree of decision function reduction $$F_j(\lambda) = \|W_r \cdot (a_r + A \cdot T \cdot (q_1 + \lambda \cdot e_j))\|^2,$$

where $e_j$ is a 2N-dimensional vector, the j-th coordinate of which equals 1 and the remaining coordinates are zero.

23. The multi-user radio communication system of claim 21, wherein, in forming the first $x_1$ and the second $x_2$ optimized vectors, the step value is selected from the multitude of $\{-1, 0, 1\}$.

24. The multi-user radio communication system of claim 21, wherein, when the optimal auxiliary vector is determined, the transmitted signal power is estimated by $\|W_r \cdot (a_r + A \cdot T \cdot q)\|^2$.

25. The multi-user radio communication system of claim 21, wherein the optimal perturbing vector $p_{opt}$ is formed using the optimal auxiliary vector $q_{opt}$, the value A and matrix $W_r$ by the formula $$p_{opt} = A \cdot T \cdot q_{opt},$$

where T is an integer-valued matrix with the determinant equal to ±1, multiplication by which transforms the matrix $W_r$ into the matrix $Z=W_r T$, which has a certain low condition value.

26. The multi-user radio communication system of claim 17, wherein, in forming a transmitted signal vector, the normalizing coefficient $C_T$ is selected in such a way that the average transmit power of the formed vector x is equal to the power of signals transmitted by the receive stations without multi-user transformation.

27. The multi-user radio communication system of claim 17, wherein the normalizing coefficient $C_R$ is set to equal the inverse value of the normalizing transfer coefficient:

$$C_R = \frac{1}{C_T}.$$

28. The multi-user radio communication system of claim 17, wherein the spatial communication channels is formed by one transmit antenna of the transmit station and one receive antenna of a receive station for each of F physical channels.

29. The multi-user radio communication system of claim 17, wherein, at the transmit station, U respective sets of modulation symbols are generated from U information messages to be transmitted to U receive stations, the resulting modulation symbol sets are used to generate F packets each having S modulation symbols, where $S_k$ modulation symbols are included in each packet for each k-th receive station, and $S_k$ is the number of receive antennas of the k-th receive station.

30. The multi-user radio communication system of claim 17, wherein, each of F modulation symbol packets are transmitted over a corresponding physical channel in such a way that each modulation symbol is represented by a complex number a, and a modulation symbol packet is represented as a vector of transmitted modulation symbol $a = [a_1 \ldots a_S]^T$.

31. The multi-user radio communication system of claim 17, wherein the real-valued vector $a_r$ and the matrix $H_r$ are formed as $$a_r = \begin{bmatrix} \mathrm{Re}\, a \\ \mathrm{Im}\, a \end{bmatrix}, H_r = \begin{bmatrix} \mathrm{Re}\, H & -\mathrm{Im}\, H \\ \mathrm{Im}\, H & \mathrm{Re}\, H \end{bmatrix},$$

where ReH, ImH are matrices made up of real and imaginary parts of the respective elements of the matrix H.

32. The multi-user radio communication system of claim 17, wherein the resulting vector is subjected to multi-user transformation thereby providing a real-valued transmitted signal vector as $$x_r = W_r(a_r + p_{opt}),$$

the resulting vector $x_r$ is used to obtain the non-normalized transmitted signal vector $$x_0 = x_r(1:N) + j \cdot x_r(N+1:2N),$$

where j is an imaginary unit, and $x_r(n:m)$ denotes a vector comprising a sequence of $x_r$ vector elements from the n-th to the m-th.

33. A method of signal transmission by a base station including N>1 transmit antennas, the method comprising:
- estimating transfer coefficients of all possible spatial communication channels formed by each transmit antenna and a plurality of receive antennas for each of F physical channels;
- transmitting signals using the F physical channels, wherein U respective sets of modulation symbols are generated from U information messages to be transmitted to U receive stations;
- generating F packets using the generated modulation symbol sets, where $S_k$ modulation symbols are included in each packet for each k-th receive station, $S_k$ being the number of receive antennas of the k-th receive station;
- transmitting each of F modulation symbol packets over a corresponding physical channel in such a way that each modulation symbol is represented by a complex number a, and a modulation symbol packet is represented as a vector of transmitted modulation symbol $a=[a_1 \ldots a_S]^T$;
- estimating spatial channel transfer coefficients used to form a channel matrix H of the physical channel;
- forming a real-valued vector $a_r$ and a matrix $H_r$ using a transmitted modulation symbol vector a and the channel matrix H according to:

$$a_r = \begin{bmatrix} \text{Re}\,a \\ \text{Im}\,a \end{bmatrix}, H_r = \begin{bmatrix} \text{Re}H & -\text{Im}H \\ \text{Im}H & \text{Re}H \end{bmatrix},$$

where ReH, ImH are matrices made up of real and imaginary parts of the respective elements of the matrix H;
- forming a linear multi-user transformation matrix $W_r$ using the real-valued channel matrix $H_r$;
- determining an optimal perturbing vector using the real-valued vector $a_r$ and linear multi-user transformation matrix $W_r$ in such a way as to minimize the transmitted signal power, wherein the optimal perturbing vector is selected among a set of vectors p, elements of which includes a multiple of a real number A, and selected in such a way that the absolute value of real and imaginary parts of any modulation symbol would not exceed A/2, and further wherein the determining of the optimal perturbing vector is performed in such a way that the vector $a_r$ and matrix $W_r$ are used to form an auxiliary vector $q_0$ which determines the initial search point so that vector $A \cdot q_0$ belongs to the set of perturbing vectors p;
- sequentially determining an optimal variation step value for each coordinate of auxiliary vector $q_0$, which provides a maximum degree of transmitted signal power reduction;
- determining a suboptimal step value, which provides a lower degree of transmitted signal power reduction;
- forming a first optimized vector $q_1$ by adding the optimal value of the respective coordinate variation step to each coordinate of the auxiliary vector $q_0$;
- forming a second optimized vector $q_2$ by adding the suboptimal value of the respective coordinate variation step to each coordinate of auxiliary vector $q_0$;
- forming a set of candidate vectors using the first $q_1$ and the second $q_2$ optimized vectors including the vectors each coordinate of which is a respective coordinate of the first $q_1$ or the second $q_2$ optimized vector, and each of these vectors is included in the candidate vector set considering the transmitted signal power corresponding to this vector;
- determining an optimal auxiliary vector $q_{opt}$ as a vector of the candidate vector set providing minimum transmitted signal power using the real-valued vector $a_r$ and linear multi-user transformation matrix $W_r$;
- forming an optimal perturbing vector $p_{opt}$, to complete the determination for the optimal perturbing vector, using the optimal auxiliary vector $q_{opt}$, the value A and matrix $W_r$;
- generating a perturbed real-valued vector of transmitted modulation symbols by adding the real-valued transmitted modulation symbols vector to the optimal perturbing vector, wherein the resulting vector is subjected to multi-user transformation thereby providing a real-valued transmitted signal vector as $x_r = W_r(a_r + p_{opt})$;
- obtaining the non-normalized transmitted signal vector $x_0 = x_r(1:N) + j \cdot x_r(N+1:2N)$ using the resulting vector $x_r$, where j is an imaginary unit, and $x_r(n:m)$ denotes a vector comprising a sequence of $x_r$ vector elements from the n-th to the m-th;
- forming a vector of transmitted signals x by multiplying the non-normalized transmitted signals vector $x_0$ by the normalizing coefficient $C_T$, where $x = x_0 \cdot C_T$; and
- respectively transmitting a set of signals corresponding to the elements of the obtained vector x over an appropriate physical channel via all transmit antennas.

34. The method of claim 33, wherein the modulation symbols of the transmit station are generated so that each of U information messages to be transmitted to U receive stations are correspondingly represented as a sequence of binary symbols and the binary symbols of the said sequence are coded, interleaved and modulated.

35. The method of claim 33, wherein the linear multi-user transformation matrix $W_r$ is formed as $$W_r = (H_r^H H_r)^{-1} H_r^H$$

where $H_r$ is a real-valued channel matrix of the respective physical channel.

36. The method of claim 33, further comprising forming an auxiliary vector $q_0$, which determines the search start, in such a way that by performing the matrix $W_r$ lattice basis reduction, an integer-valued matrix T with a determinant equal to ±1 is formed so that multiplication by T transforms the multi-user transformation matrix into a matrix $Z = W_r T$ which has a low condition value and wherein the matrix T and the real-valued vector of transmitted modulation symbols $a_r$ are used to determine an auxiliary vector as $$q_0 = -Q(T^{-1} \cdot a_r / A),$$

where Q(x) is a vector obtained from vector x by rounding its elements to the closest integers.

37. The method of claim 33, wherein the forming of the first $q_1$ and the second $q_2$ optimized auxiliary vectors, comprises determining the degree of transmission power reduction due to changing the j-th vector coordinate based on the degree of decision function reduction $$F_j(\lambda) = \|W_r \cdot (a_r + A \cdot T \cdot (q_1 + \lambda \cdot e_j))\|^2,$$

where $e_j$ is a 2N-dimensional vector, the j-th coordinate of which equals 1 and the remaining coordinates are zero.

38. The method of claim 33, wherein, the forming of the first $x_1$ and the second $x_2$ optimized vectors comprises selecting the step value from the multitude of $\{-1,0,1\}$.

39. The method of claim 33, wherein, when the optimal auxiliary vector is determined, the transmitted signal power is estimated by $\|W_r \cdot (a_r + A \cdot T \cdot q)\|^2$.

40. The method of claim 33, wherein the optimal perturbing vector $p_{opt}$ is formed using the optimal auxiliary vector $q_{opt}$, the value A and matrix $W_r$ by the formula $$p_{opt} = A \cdot T \cdot q_{opt},$$

where T is an integer-valued matrix with the determinant equal to $\pm 1$, multiplication by which transforms the matrix $W_r$ into the matrix $Z = W_r T$, which has a certain low condition value.

41. The method of claim 33, wherein, in forming a transmitted signal vector, the normalizing coefficient $C_T$ is selected in such a way that the average transmit power of the formed vector x is equal to the power of signals transmitted by the receive stations without multi-user transformation.

42. The method of claim 33, wherein the normalizing coefficient $C_R$ is set to equal the inverse value of the normalizing transfer coefficient:

$$C_R = \frac{1}{C_T}.$$

* * * * *